United States Patent
Wygodny et al.

(10) Patent No.: US 6,202,199 B1
(45) Date of Patent: *Mar. 13, 2001

(54) SYSTEM AND METHOD FOR REMOTELY ANALYZING THE EXECUTION OF COMPUTER PROGRAMS

(75) Inventors: Shlomo Wygodny, Ramat Hasharon; Dmitry Barboy, Rehovot, both of (IL); Georgi Prouss, Kiev (UA); Anatoly Vorobey, Rishon Lezion (IL)

(73) Assignee: Mutek Solutions, Ltd., Or Yehuda (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,120

(22) Filed: Jul. 30, 1998

Related U.S. Application Data

(60) Provisional application No. 60/055,165, filed on Jul. 31, 1997.

(51) Int. Cl.[7] .................................................. G06F 9/45
(52) U.S. Cl. .................................... 717/4; 717/4; 717/11; 702/183
(58) Field of Search .................................... 395/704, 705; 709/221, 200, 253, 224, 317, 318; 717/4, 1, 45, 46, 25; 702/187

(56) References Cited

U.S. PATENT DOCUMENTS 4,879,646 * 11/1989 Iwasaki et al. ...................... 712/227
5,021,949 * 6/1991 Morten et al. ....................... 709/231

(List continued on next page.)

FOREIGN PATENT DOCUMENTS

WO 96/05556  2/1996  (WO) .

OTHER PUBLICATIONS

Rosenberg, Jonathan B., *How Debuggers Work: Algorithms, Data Structures, and Architecture*, John Wiley & Sons, Inc., 1996.

(List continued on next page.)

*Primary Examiner*—Tariq R. Hafiz
*Assistant Examiner*—Anil Khatri
(74) *Attorney, Agent, or Firm*—Knobbe, Martens, Olson & Bear, LLP.

(57) ABSTRACT

A software system is disclosed which facilitates the process of tracing the execution paths of a program, called the client. The tracing is performed without requiring modifications to the executable or source code files of the client. Trace data collected during the tracing operation is collected according to instructions in a trace options file. At run time, the tracing library attaches to the memory image of the client. The tracing library is configured to monitor execution of the client and to collect trace data, based on selections in the trace options file. The developer then uses a trace analyzer program, also having a graphical user interface, to view the trace information. The system can trace multiple threads and multiple processes. The tracing library is preferably configured to runs in the same process memory space as the client thereby tracing the execution of the client program without the need for context switches. The tracing system provides a remote mode and an online mode. In remote mode, the developer sends the trace control information to a remote user site together with a small executable image called the agent that enables a remote customer, to generate a trace file that represents execution of the client application at the remote site. In online mode, the developer can generate trace options, run and trace the client, and display the trace results in near real-time on the display screen during execution of the client program.

33 Claims, 15 Drawing Sheets

U.S. PATENT DOCUMENTS

| | | | |
|---|---|---|---|
| 5,121,489 | | 6/1992 | Andrews .................................. 714/38 |
| 5,265,254 | * | 11/1993 | Blasciak et al. ...................... 395/704 |
| 5,386,522 | | 1/1995 | Evans ..................................... 395/704 |
| 5,386,565 | | 1/1995 | Tanaka et al. ........................ 395/704 |
| 5,394,544 | | 2/1995 | Motoyama et al. ................... 714/31 |
| 5,408,650 | | 4/1995 | Arsenault .............................. 395/704 |
| 5,410,685 | | 4/1995 | Banda et al. ........................... 714/38 |
| 5,421,009 | * | 5/1995 | Platt ....................................... 709/221 |
| 5,446,876 | * | 8/1995 | Levine et al. .......................... 714/47 |
| 5,450,586 | * | 9/1995 | Kuzara et al. ........................ 395/704 |
| 5,481,740 | | 1/1996 | Kodosky ............................... 345/339 |
| 5,526,485 | | 6/1996 | Brodsky ................................. 714/38 |
| 5,533,192 | | 7/1996 | Hawley et al. ........................ 714/28 |
| 5,581,697 | | 12/1996 | Gramlich et al. ...................... 714/35 |
| 5,612,898 | | 3/1997 | Huckins ............................... 709/224 |
| 5,615,331 | * | 3/1997 | Toorians et al. ......................... 714/9 |
| 5,632,032 | | 5/1997 | Ault et al. ............................... 709/10 |
| 5,642,478 | | 6/1997 | Chen et al. ............................. 714/45 |
| 5,745,748 | * | 4/1998 | Ahmad et al. ......................... 707/10 |
| 5,771,385 | * | 6/1998 | Harper ................................... 395/704 |
| 5,896,535 | * | 4/1999 | Ronstrom ............................. 395/701 |
| 5,928,369 | * | 7/1999 | Keyser et al. ......................... 714/47 |
| 6,026,433 | * | 2/2000 | D'Arlach et al. .................... 709/217 |
| 6,026,438 | * | 2/2000 | Piazza et al. ......................... 709/221 |
| 6,065,043 | * | 5/2000 | Domenikos et al. ................. 709/203 |
| 6,108,330 | * | 8/2000 | Bhatia et al. ......................... 370/352 |

OTHER PUBLICATIONS

Geer, C. P. et al., *IBM Technical Disclosure Bulletin: Instruction Stream Trace*, vol. 26, No. 11, Apr. 1984, pp. 6217–6220.

Hunt, T. A., *IBM Technical Disclosure Bulletin: General Trace Facility*, vol. 15, No. 8, Jan. 1973, pp. 2446–2448.

Harward, Jr., L. D. *IBM Technical Disclosure Bulletin: PL/1 Trace Program*, vol. 13, No. 4, Sep. 1970, pp 855–857.

Larus, James R., "Efficient Program Tracing," *IEEE Software* magazine, May 1993, pp. 52–61.

Malony, Allen D. et al., "Traceview: A Trace Visualization Tool," *IEEE Software* magazine, Sep. 1991, pp. 19–28.

Martonosi, Margaret et al., "Effectiveness of Trace Sampling for Performance Debugging Tools" article, 1993, pp. 248–259.

Netzer, Robert H. B. et al., "Optimal Tracing and Incremental Reexecution for Debugging Long–Running Programs," ACM SIGPLAN '94 Conference on Programming Language Design and Implementation (PLDI), Jun. 20–24, 1994, Orlando Florida, pp. 313–325.

Netzer, Robert H. B., "Optimal Tracing and Replay for Debugging Shared–Memory Parallel Programs," ACM/ONR Workshop on Parallel and Distributed Debugging, May 17–18, 1993, San Diego, California, pp. 1–12.

Plattner, Bernhard et al., "Monitoring Program Execution: A Survey" article, *IEEE Software* magazine, Nov. 1981, pp. 76–93.

Reiss, Steven P., "Trace–Based Debugging, " Automated and Algorithmic Debugging Workshop, May 3–5, 1993, Linköpking, Sweden, pp. 305–314.

Schieber, Colleen D. et al., "RATCHET: Real–Time Address Trace Compression Hardware for Extended Traces," Performance Evaluation Review, vol. 21, #3 and 4, Apr. 1994, pp. 22–32.

Soule, K., *IBM Technical Disclosure Bulletin: Algorithm For Tracing Execution Paths to a Given Location in a Program*, vol. 14, No. 4, Sep. 1971, pp. 1016–1019.

Spinellis, Diomidis, "Trace: A Tool for Logging Operating System Call Transaction," Operating Systems Review publication, vol. 28, No. 4, Oct. 1994, pp. 56–63.

Timmerman, M. et al., "High Level Tools for the Debugging of Real–Time Multiprocessor Systems," ACM/ONR Workshop on Parallel and Distributed Debugging, May17–18, 1993, San Diego, California, pp. 151–158.

Tsai, Jeffrey J. P. et al., "A Noninvasive Architecture to Monitor Real–Time Distributed Systems," *IEEE Software* magazine, Mar. 1990, pp. 11–23.

Wilner, David, "WindView: A Tool for Understanding Real–time Embedded Software Through System Vizualization," ACM SIGPLAN Notices, vol. 30, No. 11, Nov. 1995, pp. 117–123.

Goldszmidt et al, "Interactive blackbox debugging for concurrent language", ACM pp 271–282, 1990.*

Appelbe et al., "Integrating tools for debugging and developing multitasking programs", ACM, pp. 78–88, 1993.*

Wismuller, "Debugging of globally optimized programs using data flow analysis", ACM SIGPLAN pp 278–289, Apr. 1994.*

Bates, "Debugging heterogeneous distributed system using event based models of behavior", ACM pp 11–22, 1992.*

Redell, "Experience with Topaz teledebugging", ACM SIGPLAN & SIGOPS, pp 35–44, 1990.*

Meier et al. "Experience with bulding distributed debuggers", SPDT ACM, pp 70–79, 1996.*

Bates, "Debugging heterogenous distributed systems using event based models of behavior", ACM Tran. comp. sys. vol 13, No. 1, pp 1–31, Feb. 1995.*

Bruegge et al, "A framework for dynamic program analyzers", OOPSLA ACM, pp 65–82, 1996.*

* cited by examiner

SYSTEM AND METHOD FOR REMOTELY ANALYZING THE EXECUTION OF COMPUTER PROGRAMS

REFERENCE TO RELATED APPLICATION

The present application claims priority benefit of provisional application Ser. No. 60/055,165, filed Jul. 31, 1997, the disclosure of which is incorporated herein by reference in its entirety.

BACKGROUND OF THE INVENTION

1. Field of the Invention

The present invention relates to software tools for assisting software developers in the task of monitoring and analyzing the execution of computer programs, such as during the debugging process.

2. Description of the Related Art

Despite the significant diversity in software tracing and debugging programs ("debuggers"), virtually all debuggers share a common operational model: the developer notices the presence of a bug during normal execution, and then uses the debugger to examine the program's behavior. The second part of this process is usually accomplished by setting a breakpoint near a possibly flawed section of code, and upon reaching the breakpoint, single-stepping forward through the section of code to evaluate the cause of the problem.

Two significant problems arise in using this model. First, the developer needs to know in advance where the problem resides in order to set an appropriate breakpoint location. Setting such a breakpoint can be difficult when working with an event-driven system (such as the Microsoft Windows® operating system), because the developer does not always know which of the event handlers (callbacks) will be called.

The second problem is that some bugs give rise to actual errors only during specific execution conditions, and these conditions cannot always be reproduced during the debugging process. For example, a program error that occurs during normal execution may not occur during execution under the debugger, since the debugger affects the execution of the program. This situation is analogous to the famous "Heizenberg effect" in physics: the tool that is used to analyze the phenomena actually changes its characteristics. The Heizenberg effect is especially apparent during the debugging of time-dependent applications, since these applications rely on specific timing and synchronization conditions that are significantly altered when the program is executed step-by-step with the debugger.

An example of this second type of problem is commonly encountered when software developers attempt to diagnose problems that have been identified by customers and other end users. Quite often, software problems appear for the first time at a customer's site. When trying to debug these problems at the development site (typically in response to a bug report), the developer often discovers that the problem cannot be reproduced. The reasons for this inability to reproduce the bug may range from an inaccurate description given by the customer, to a difference in environments such as files, memory size, system library versions, and configuration information. Distributed, client/server, and parallel systems, especially multi-threaded and multi-process systems, are notorious for having non-reproducible problems because these systems depend heavily on timing and synchronization sequences that cannot easily be duplicated.

When a bug cannot be reproduced at the development site, the developer normally cannot use a debugger, and generally must resort to the tedious, and often unsuccessful, task of manually analyzing the source code. Alternatively, a member of the software development group can be sent to the customer site to debug the program on the computer system on which the bug was detected. Unfortunately, sending a developer to a customer's site is often prohibitively time consuming and expensive, and the process of setting up a debugging environment (source code files, compiler, debugger, etc.) at the customer site can be burdensome to the customer.

Some software developers attempt to resolve the problem of monitoring the execution of an application by imbedding tracing code in the source code of the application. The imbedded tracing code is designed to provide information regarding the execution of the application. Often, this imbedded code is no more than code to print messages which are conditioned by some flag that can be enabled in response to a user request. Unfortunately, the imbedded code solution depends on inserting the tracing code into the source prior to compiling and linking the shipped version of the application. To be effective, the imbedded code must be placed logically near a bug in the source code so that the trace data will provide the necessary information. Trying to anticipate where a bug will occur is, in general, a futile task. Often there is no imbedded code where it is needed, and once the application has been shipped it is too late to add the desired code.

Another drawback of current monitoring systems is the inability to correctly handle parallel execution, such as in a multiprocessor system. The monitoring systems mentioned above are designed for serial execution (single processor) architectures. Using serial techniques for parallel systems may cause several problems. First, the sampling activity done in the various parallel entities (threads or processes) may interfere with each other (e.g., the trace data produced by one entity may be over written by another entity). Second, the systems used to analyze the trace data cannot assume that the trace is sequential. For example, the function call graph in a serial environment is a simple tree. In a parallel processing environment, the function call graph is no longer a simple tree, but a collection of trees. There is a time-based relationship between each tree in the collection. Displaying the trace data as a separate calling tree for each entity is not appropriate, as this does not reveal when, during the execution, contexts switches were done between the various parallel entities. The location of the context switches in the execution sequence can be very important for debugging problems related to parallel processing.

SUMMARY OF THE INVENTION

The present invention overcomes these and other problems associated with debugging and tracing the execution of computer programs. One aspect of the present invention is a software system that facilitates the process of identifying and isolating bugs within a client program by allowing a developer to trace the execution paths of the client. The tracing can be performed without requiring modifications to the executable or source code files of the client program. Preferably, the trace data collected during the tracing operation is collected according to instructions in a trace control dataset, which is preferably stored in a Trace Control Information (TCI) file. Typically, the developer generates the TCI file by using a trace options editor program having a graphical user interface. The options editor displays the client's source code representation on a display screen together with controls that allow the software developer to interactively specify the source code and data elements to be traced. The options editor may use information created by a compiler or linker, such as debug information, in order to provide more information about the client and thereby make the process of selecting trace options easier. Once the trace options are selected, the client is run on a computer, and a tracing library is used to attach to the memory image of the client (the client process). The tracing library is configured to monitor execution of the client, and to collect trace data, based on selections in the trace options. The trace data collected by the tracing library is written to an encoded buffer in memory. The data in the buffer may optionally be saved to a trace log file for later use.

The developer then uses a trace analyzer program, also having a graphical user interface, to decode the trace information into a human-readable form, again using the debug information, and displays translated trace information on the display screen to allow the developer to analyze the execution of the client program. In a preferred embodiment, the trace options editor and the trace analyzer are combined into a single program called the analyzer. The analyzer is preferably configured to run under the control of a multi-process operating system and to allow the developer to trace multiple threads and multiple processes. The tracing library is preferably configured to run in the same process memory space as the client thereby tracing the execution of the client program without the need for context switches.

In one embodiment, the software system provides a remote mode that enables the client program to be traced at a remote site, such as by the customer at a remote customer site, and then analyzed at the developer site. When the remote mode is used, the developer sends the TCI file for the particular client to a remote user site together with a small executable file called the tracing "agent." The agent is adapted to be used at the remote user site as a stand-alone tracing component that enables a remote customer, who does not have access to the source code of the client, to generate a trace file that represents execution of the client application at the remote site. The trace file is then sent to the developer site (such as by email), and is analyzed by the software developer using the analyzer. The remote mode thus enables the software developer to analyze how the client program is operating at the remote site, without the need to visit the remote site, and without exposing to the customer the source code or other confidential details of the client program.

The software system also preferably implements an online mode that enables the software developer to interactively trace and analyze the execution of the client. When the software system is used in the online mode, the analyzer and agent are effectively combined into one program tat a developer can use to generate trace options, run and trace the client, and display the trace results in near real-time on the display screen during execution of the client program.

BRIEF DESCRIPTION OF THE DRAWINGS

A software system which embodies the various features of the invention will now be described with reference to the following drawings.

In the drawings, like reference numbers are used to indicate like or functionally similar elements. In addition, the first digit or digits of each reference number generally indicate the figure number in which the referenced item first appears.

DETAILED DESCRIPTION OF THE PREFERRED EMBODIMENT

The present invention provides a new model for tracing the execution path of and debugging a computer program. In the preferred embodiment of the invention, this tracing model is implemented within a set of tracing and debugging tools that are collectively referred to as the BugTrapper system ("BugTrapper"). The BugTrapper tools are used to monitor and analyze the execution of a computer program, referred to as a client. One feature of the BugTrapper is that it does not require special instructions or commands to be imbedded within the source code of the client, and it does not require any modifications to be made to the source or executable files of the client. "Tracing," or "to trace," refers generally to the process of using a monitoring program to monitor and record information about the execution of the client while the client is running. A "trace" generally refers to the information recorded during tracing. Unlike conventional debuggers that use breakpoints to stop the execution of a client, the BugTrapper tools collect data while the client is running. Using a process called "attaching", the BugTrapper tools instrument the client by inserting interrupt instructions at strategic points defined by the developer (such as function entry points) in the memory image of the client. This instrumentation process is analogous to the process of connecting a logic analyzer to a circuit board by connecting probes to test points on the circuit board. When these interrupts are triggered, the BugTrapper collects trace information about the client without the need for a context switch, and then allows the client to continue running.

The BugTrapper implementations described herein operate under, and are therefore disclosed in terms of, the Windows-NT and Windows-95 operating systems. It will be apparent, however, that the underlying techniques can be implemented using other operating systems that provide similar services. Other embodiments of the invention will be apparent from the following detailed description of the BugTrapper.

Overview of Bug Trapper System and User Model

The BugTrapper provides two modes of use, remote mode and online mode. As discussed in more detail in the following text accompanying FIGS. 1A–1C, using remote mode a developer can trace the remote execution of a program that has been shipped to an end user (e.g. a customer or beta user) without providing a special version of the code to the user, and without visiting the user's site or exposing the source code level details of the program to the user. The system can also be used in an online mode wherein the developer can interactively trace a program and view the trace results in real time.

Remote Mode

Figure 1A:
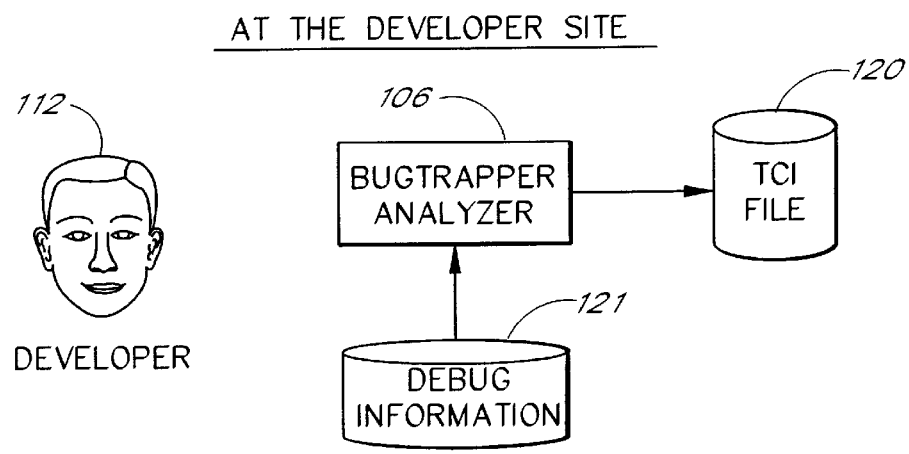
FIG. 1A is a block diagram illustrating the use of the system to create a trace control information file.
Figure 1B:
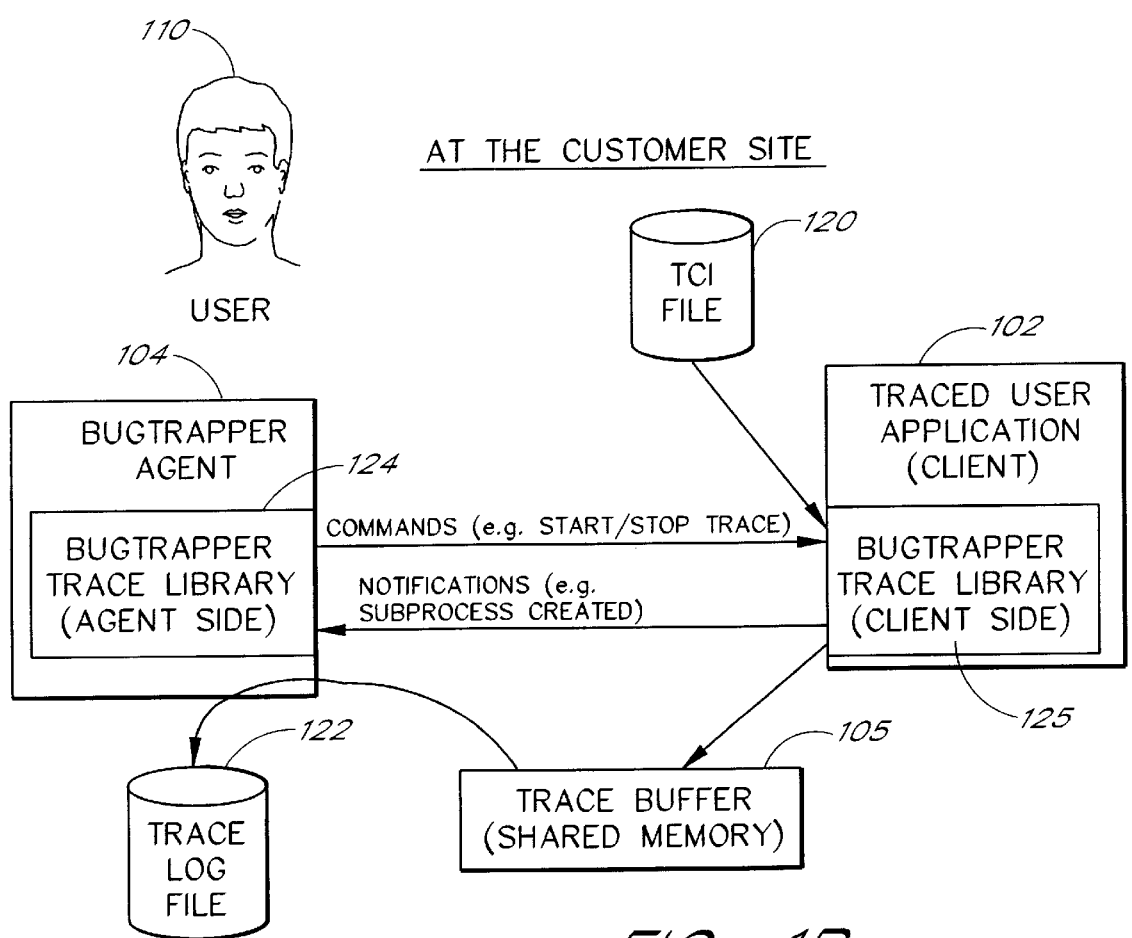
FIG. 1B is a block diagram illustrating the use of the system in remote mode.
Figure 1C:
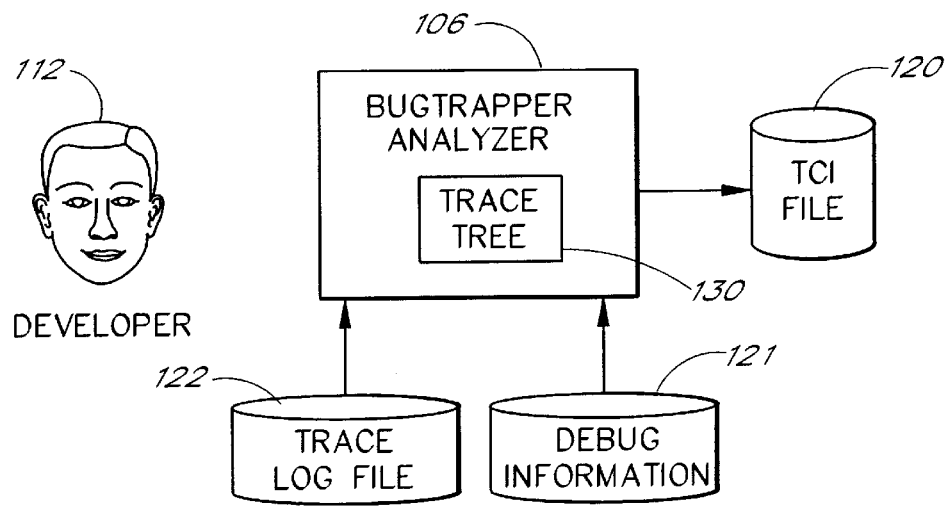
FIG. 1C is a block diagram illustrating the use of the system to analyze a trace log file.

Remote mode involves three basic steps shown in FIGS. 1A through 1C. In step 1, shown in FIG. 1A, a developer 112 uses a program called the BugTrapper analyzer 106 to create a file called a trace control information (TCI) file 120. The TCI file 120 contains instructions that specify what information is to be collected from a program to be traced (the client). The analyzer 106 obtains information about the client from a build (e.g., compile and link) by-product, such as a link map file, or, as in the preferred embodiment, a debug information file 121. Typically, the debug information file 112 will be created by a compiler and will contain information such as the names and addresses of software modules, call windows, etc. for the specific client. The developer 112 then sends the TCI file 120 and a small tracing application called the agent 104 to a user 110 as shown in FIG. 1B. The user 110 runs the agent 104 and the client 102 and instructs the agent 104 to attach to the client 102. The agent attaches to the client 102 by loading a client-side trace library 125 into the address space of the client 102. An agent-side trace library 124 is provided in the agent 104. The client-side trace library 125 and the agent-side trace library 124 are referred to collectively as the "trace library." The agent-side trace library 124 and the client-side trace library 125 exchange messages through normal interprocess communication mechanisms, and through a shared memory trace buffer 105. The agent-side trace library 124 uses information from the TCI file 102 to attach the client-side trace library 125 into the client 102, and thereby obtain the trace information requested by the developer 112.

The agent 104 and the client-side trace library 125 run in the same context so that the client 102 can signal the client-side trace library 125 without performing a context switch and thus without incurring the overhead of a context switch. For the purposes herein, a context can be a process, a thread, or any other unit of dispatch in a computer operating system. The client 102 can be any type of software module, including but not limited to, an application program, a device driver, or a dynamic link library (DLL), or a combination thereof. The client 102 can run in a single thread, or in multiple processes and/or multiple threads.

In operation, the agent 104 attaches to the client 102 using a process known as "attaching." The agent 104 attaches to the client 102, either when the client 102 is being loaded or once the client 102 is running. Once attached, the agent 104 extracts trace information, such as execution paths, subroutine calls, and variable usage, from the client 102. Again, the TCI file 120 contains instructions to the client-side trace library 125 regarding the trace data to collect. The trace data collected by the client-side trace library 125 is written to the trace buffer 105. On command from the user 110 (such as when a bug manifests itself), the agent 104 copies the contents of the trace buffer 105 to a trace log file 122. In some cases, the log data is written to a file automatically, such as when the client terminates. The user 110 sends the trace log file 122 back to the developer 112. As shown in FIG. 1C, the developer 112 then uses the analyzer 106 to view the information contained in the trace log file 122. When generating screen displays for the developer 112, the analyzer 106 obtains information from the debug information file 121. Since the analyzer 106 is used to create the TCI file 120 and to view the results in the trace log file 122, the developer can edit the TCI file 120 or create a new TCI file 120 while viewing results from a trace log file 122.

Remote mode is used primarily to provide support to users 110 that are located remotely relative to the developer 112. In remote mode, the agent 104 is provided to the user 110 as a stand-alone component that enables the user to generate a trace log file that represents the execution of the client. The TCI file 120 and the trace log file 122 both may contain data that discloses secrets about the internal operation of the client 102 and thus both files are written using an encoded format that is not readily decipherable by the user 110. Thus, in providing the TCI file 120 and the agent 104 to the user, the developer 112 is not divulging information to the user that would readily divulge secrets about the client 102 or help the user 110 in an attempt to reverse engineer the client 102. The Agent traces the client without any need for modification of the client. The developer 112 does not need to build a special version of the client 102 executable file and send it to the customer, neither does the customer need to pre-process the client executable file before tracing.

From the perspective of the remote user, the agent 104 acts essentially as a black box that records the execution path of the client 102. As explained above, the trace itself is not displayed on the screen, but immediately after the bug reoccurs in the application, the user 110 can dump the trace data to the trace log file 122 and send this file to the developer 112 (such as by email) for analysis. The developer 112 then uses the analyzer 106 to view the trace log file created by the user 110 and identify the problematic execution sequence. In remote mode, the user 110 does not need access to the source code or the debug information. The agent 104, the TCI file 120, and the trace log file 122 are preferably small enough to be sent via email between the developer 112 and the user 110. Further details regarding the remote mode of operation are provided in the sections below.

Online Mode

Figure 2:
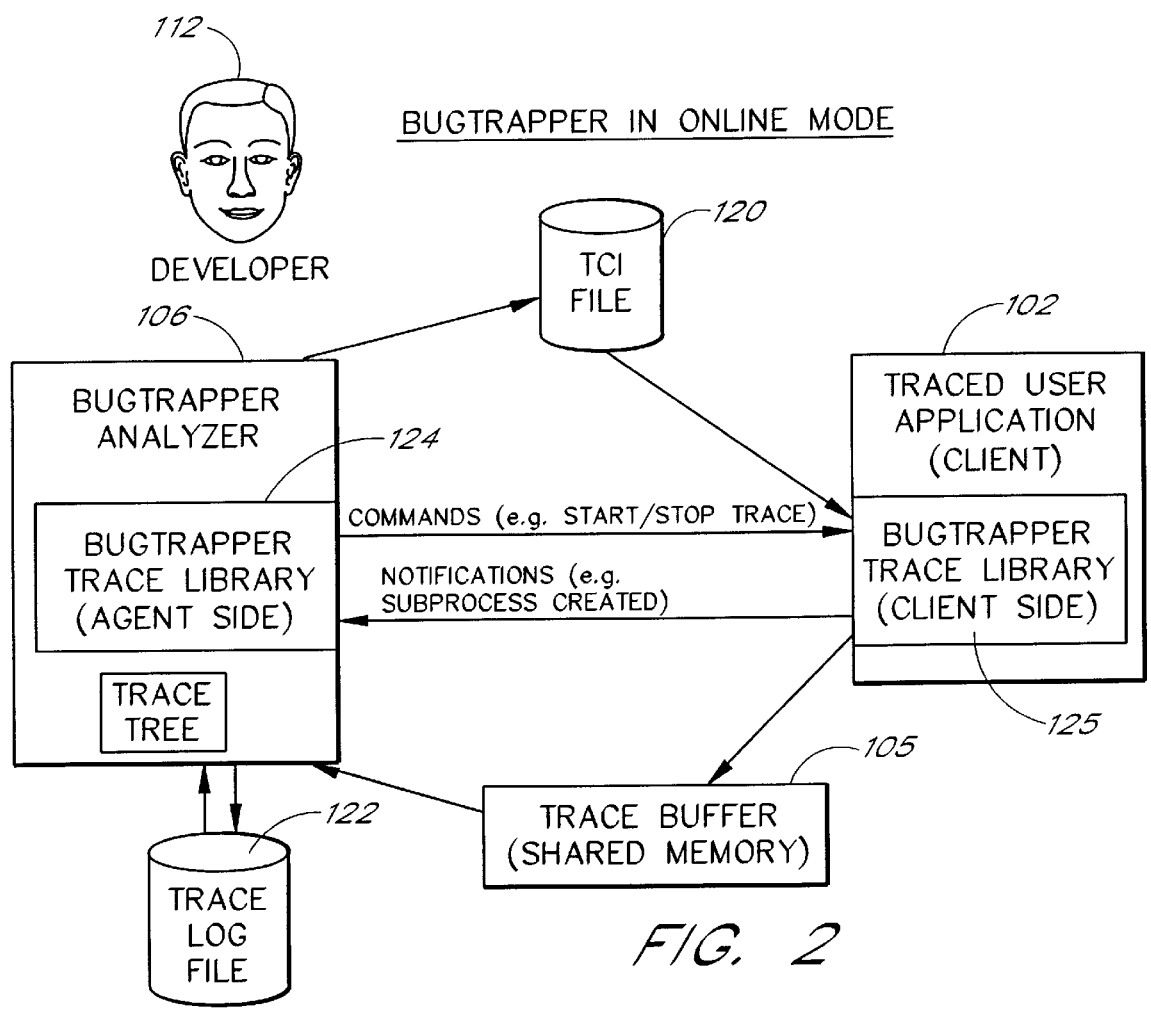
FIG. 2 is a block diagram illustrating the use of the system in online mode.

As shown in FIG. 2, the BugTrapper may also be used in an online mode rather than remote mode as shown in the previous figures. In this mode, the BugTrapper is used by the developer 112 to locally analyze a client 102, which will typically be a program that is still being developed. For example, the online mode can be used as an aid during the development as a preliminary or complementary step to using a conventional debugger. In many cases it is hard to tell exactly where a bug resides and, therefore, where breakpoints should be inserted. Online mode provides the proper basis for setting these breakpoints. Later, if further analysis is required, a more conventional debugger can be used. In online mode, the analyzer 106 is used to perform all of its normal operations (e.g. creating the TCI file 120 and viewing the trace results) as well as the operations performed by the agent 104 in remote mode. Thus, in online mode, the agent 104 is not used because it is not needed. The developer 112 uses the analyzer 106 to run the client 102 and attach the client-side trace library 125 to the client 102. In online mode, the analyzer 106 reads the trace buffer 105 in near real-time to provide near real-time analysis functionality. In the online mode, the analyzer 106 immediately displays the trace information to the developer 112.

The developer 112 uses the analyzer 106 to interactively create trace control information (TCI). The TCI may be sent to the client-side trace library 125 via file input/output operations or through conventional inter-process communication mechanisms such as shared memory, message passing or remote procedure calls. The TCI indicates to the client-side trace library 125 what portions of the client 102 to trace, and when the tracing is to be performed. As the client program 102 runs, the client-side trace library 125 collects the trace information and relays the information back to the analyzer 106, which displays the information in near real-time within one or more windows of the BugTrapper.

Operational Overview of the Tracing Function

Regardless of which operational mode is used (online or remote), the client 102 is run in conjunction with the client-side trace library 125. As described in detail below, the client-side trace library 125 is attached to the in-memory image of the client 102 and generates trace information that describes the execution of the client 102. The TCI file 120, provided by the developer 112, specifies where tracing is to take place and what information will be stored. Because the client is traced without the need for context switches, the effect of this tracing operation on the performance of the client 102 is minimal, so that even time-dependent bugs can be reliably diagnosed. As described below, this process does not require any modification to the source or object code files of the client 102, and can therefore be used with a client 102 that was not designed to be traced or debugged.

The analyzer 106 is used to analyze the trace data and isolate the bug. The developer 112 may either analyze the trace data as it is generated (online mode), or the developer 112 may analyze trace data stored in the trace log file 122 (mainly remote mode). As described below, the assembly level information in the trace log file is converted back to a source level format using the same debug information used to create the TCI file 120. During the trace analysis process, the analyzer 106 provides the developer 112 with execution analysis options that are similar to those of conventional debuggers, including options for single stepping and running forward through the traced execution of the client 102 while monitoring program variables. In addition, the analyzer 106 allows the developer 112 to step backward in the trace, and to search for breakpoints both in the future and in the past.

The attaching mechanism used to attach the client-side trace library 125 to the client 102 involves replacing selected object code instructions (or fields of such instructions) of the memory image of the client 102 with interrupt (INT) instructions to create trace points. The locations of the interrupts are specified by the TCI file 122 that is created for the specific client 102. When such an interrupt instruction is executed, a branch occurs to the tracing library 125. The client-side trace library 125 logs the event of passing the trace point location and captures pre-specified state information, such as values of specific program variables and microprocessor registers. The instructions that are replaced by the interrupt instructions are maintained within a separate data structure to preserve the functionality of the application.

Overview of the Analyzer User Interface

The analyzer 106 comprises a User Interface module that reads trace data, either from the trace buffer 105 (during on-line mode tracing) or from the trace log file 122 (e.g. after remote tracing) and displays the data in a format, such as a trace tree, that shows the sequence of traced events that have occurred during execution of the client 102. Much of the trace data comprises assembly addresses. With reference to FIG. 1C, the analyzer 106 uses the debug information 121 to translate the traced assembly addresses to comprehensive strings that are meaningful to the developer. In order to save memory and gain performance, this translation to strings is preferably done only for the portion of the trace data which is displayed at any given time, not the whole database of trace data. Thus, for example, in formatting a screen display in the user interface, only the trace data needed for the display in the user interface at any given time is read from the log file 122. This allows the analyzer 106 to display data from a trace log file 122 with more than a million trace records.

The debug information 121 is preferably created by a compiler when the client is compiled. Using the debug information 121 the analyzer translates function names and source lines to addresses when creating the TCI file 120. Conversely, the analyzer 106 uses the debug information 121 to translate addresses in the trace data back into function names and source lines when formatting a display for the user interface. One skilled in the art will recognize that other build information may be used as well, including, for example, information in a linker map file and the Type Library information available in a Microsoft OLE-compliant executable.

Preferably, the debug information is never used by the trace libraries 124, 125 or the agent 102, but only by the analyzer 106. This is desirable for speed because debug information access is typically relatively slow. This is also desirable for security since there is no need to send to the user 110 any symbolic information that might disclose confidential information about the client 102.

The analyzer 106 allows the developer 112 to open multiple trace tree windows and define a different filter (trace control instructions) for each of window. When reading a trace record, each window filter is preferably examined separately to see if the record should be displayed. The filters from the various windows are combined in order to create the TCI file 120, which is read by the client-side trace library 125. In other words, the multiple windows with different filters are handled by the User Interface, and the client-side trace library 125 reads from a single TCI file 120.

Figure 3A:
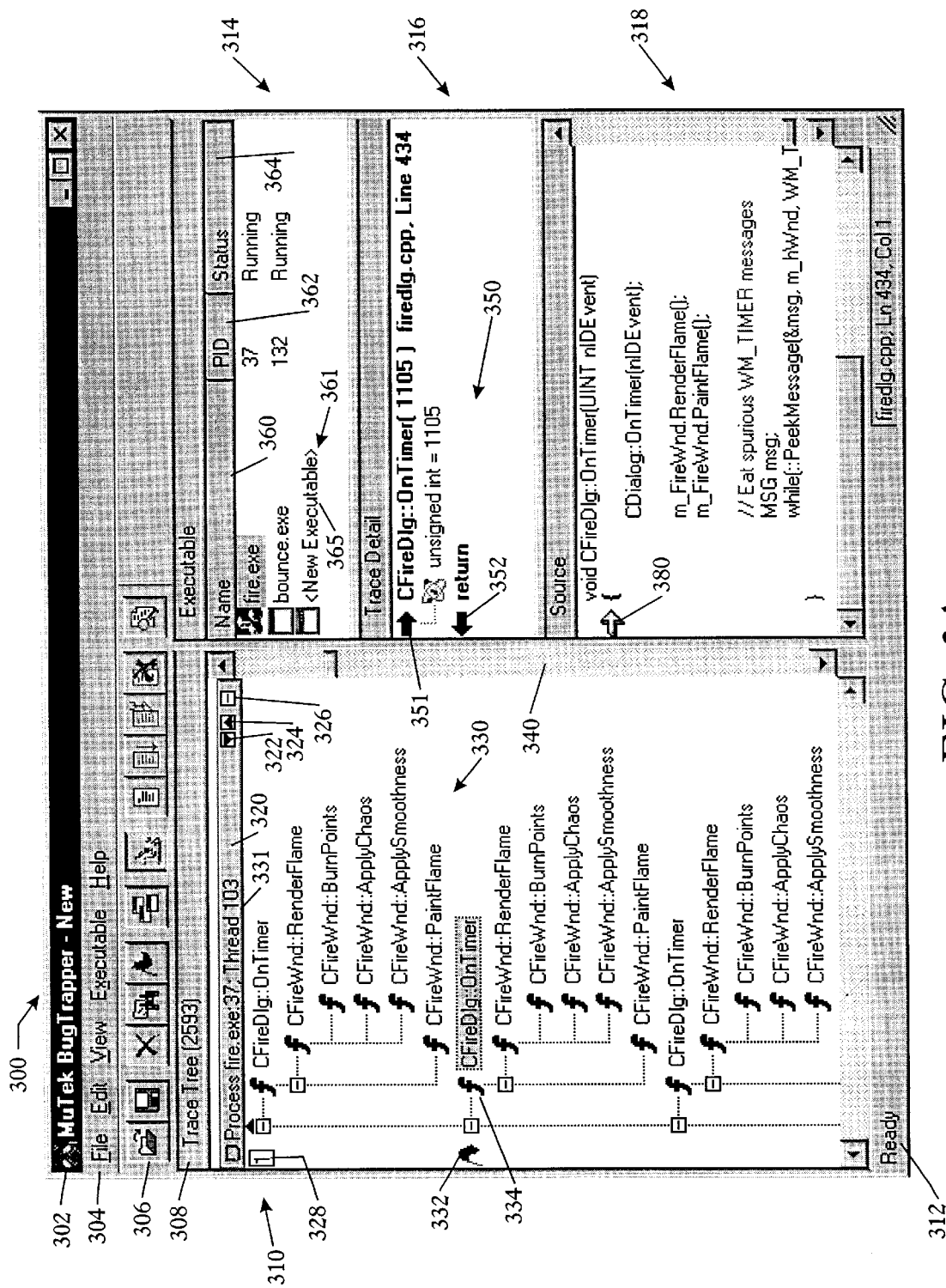
FIG. 3A is an illustration of a typical main frame window provided by the system's trace analyzer module.

FIG. 3A is an illustration of a typical frame window 300 provided by the analyzer 106. The analyzer frame window 300 displays similar information both when performing online tracing (online mode) and when displaying a trace log file (remote mode). The frame window 300 is a split frame having four panes. The panes include a trace tree pane 310, an "executable" pane 314, a trace detail pane 316, and a source pane 318. The analyzer frame 300 further provides a menu bar 304, a dockable toolbar 306, and a status bar 312. The menu bar 304 provides drop-down menus labeled "File," "Edit," "View," "Executable," and "Help." The trace tree pane 310 contains a thread caption bar 320, described below in connection with the Analyzer. Below the thread caption bar 320 is a trace tree 330. The trace tree 330 is a hierarchical tree control that graphically displays the current trace information for the execution thread indicated in the thread caption bar 320. The trace tree 330 displays, in a hierarchical tree graph, the sequence of function calls and returns (the dynamic call tree) in the executable programs (collectively the client 102) listed in the executable pane 314. Traced source lines also appear in the trace tree, between the call and return of the function in which the lines are located. FIG. 3 illustrates a single thread header and thread tree combination (the items 320 and 330). However, multiple thread captions and thread tree combinations will be displayed when there are context switches between multiple threads or processes.

The executable pane 314 displays an "executable" listbox 361. Each line in the executable listbox 361 displays information about an executable image that is currently being traced. Each line in the list box 361 displays a filename field 360, a process id (PID) field 362, and a status field 364.

The status bar 312 displays the status of the analyzer 106 (e.g. Ready), the source code file containing the source code listed in the source code pane 318, and the line and column number of a current line in the source pane 318.

The toolbar 306 provides windows tooltips and the buttons listed in Table 1.

Figure 3B:
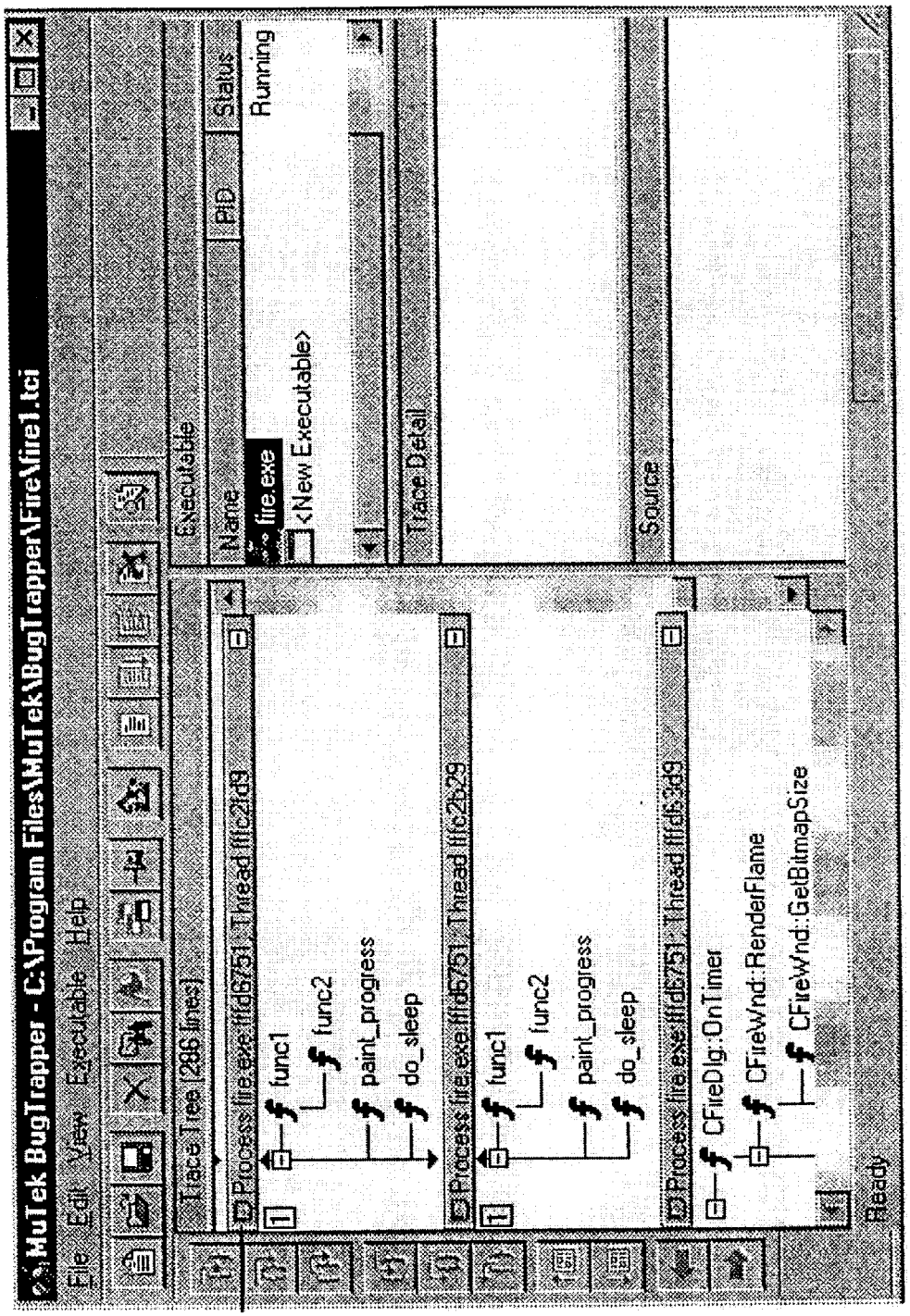
FIG. 3B is an illustration of a typical main frame window showing multiple threads.

FIG. 3B shows a typical frame window 300 with multiple threads in the trace tree pane 310. FIG. 3B shows a separate trace tree for each thread and a thread caption bar (similar to the thread caption bar 320 shown in FIG. 3A) for each thread.

TABLE 1

Buttons on the toolbar 306

| Button | Menu Equivalent | Key | Description |
| --- | --- | --- | --- |
| "Open" | File \| Open | Ctrl+0 | Opens an existing Trace Control Information file. |
| "Save" | File \| Save | Ctrl+S | Saves the current Trace Control Information to a file. |
| "Clear" | Edit \| Clear All | | Clears the Trace Tree pane, the Trace Detail pane, and the Source pane. |
| "Find" | Edit \| Find | Ctrl+F | Finds a specific string in the executable source code or trace tree. |
| "Bookmark" | Edit \| Bookmark | | Adds or deletes a bookmark for the currently selected function, or edits the name of an existing bookmark. |
| "Window" | View \| New Window | | Opens a new instance of the analyzer. |
| "Start/Stop" | Executable \| Start/Stop Trace | | Starts or stops tracing the executables listed in the Executable pane. |
| "Add" | Executable \| Add | Ins | Adds an executable to the Executable pane, without running it, so that it can be run and traced at a later date. |
| "Run" | Executable \| Run | F5 | When the <New Executable> string is selected, adds an executable to the Executable pane, starts this executable and begins tracing. When an executable which is not running is selected in the Executable pane, starts this executable and begins tracing. |
| "Attach" | Executable \| Attach | | When the <New Executable> string is selected, attaches a running executable to the Executable pane and begins tracing. When an executable that is not traced is selected, attaches the running process of this executable, if it exists. |
| "Terminate" | Executable \| Terminate | | Terminates the executable currently selected in the Executable pane. |
| "Options" | Executable \| Trace Options | | Opens the Trace Options window in which you can specify the elements that you want to trace for the selected executable. |

Typical values for the status field 364 include "running," "inactive," and "exited." The trace detail pane 316 contains a trace detail tree 350, which that is preferably implemented as a conventional hierarchical tree control. The trace detail tree 350 displays attributes, variables such as arguments in a function call window, and function return values of a function selected in the trace tree 330. The source pane 318 displays a source listing of one of the files listed in the source listbox 361. The source listing displayed in the source pane 318 corresponds to the source code of the function selected in the trace tree 330 or to the selected source line. The source code is automatically scrolled to the location of the selected function.

The frame window 300 also contains a title bar which displays the name of the analyzer 106 and a file name of a log or Trace Control Information (TCI) file that is currently open. If the current file has not yet been saved, the string "-New" is concatenated to the file name display.

Using the Analyzer to Create the TCI File

The TCI file 120 specifies one or more clients 102 and the specific elements (functions, processes and so on) to be traced either in online or remote mode. The TCI information is specified in a trace options window (described in the text associated with FIG. 5). The TCI file 120 is used to save trace control information so that the same trace options can be used at a later time and to send trace control information to a user 110 to trace the client 102. The subsections that follow provide a general overview of selecting trace information for a TCI file 120 and descriptions of various trace options, different ways to access the trace options, and how to use the trace options to specify elements to be traced.

The TCI file 120 for a client 102 is interactively generated by the software developer 112 using the analyzer 106. During this process, the analyzer 106 displays the source structure (modules, directories, source files, C++ classes, functions, etc.) of the client 102 using the source code debug information 121 generated by the compiler during compilation of the client 102. As is well known in the art, such debug information 121 may be in an open format (as with a COFF structure), or proprietary format (such as the Microsoft PDB format), and can be accessed using an appropriate application program interface (API). Using the analyzer 106, the developer 112 selects the functions and source code lines to be traced. This information is then translated into addresses and instructions that are recorded within the TCI file. In other embodiments of the invention, trace points may be added to the memory image of the client 102 by scanning the image's object code "on the fly" for specific types of object code instructions to be replaced.

Trace control information is defined for a specific client 102. In order to access the trace tool, the developer 112 first adds the desired programs 110 to the list of executables shown in the executable pane 314 shown in FIG. 3. The executable is preferably compiled in a manner such that debug information is available. In many development environments, debug information may be included in an optimized "release" build such that creation of the debug information does not affect the optimization. In a preferred embodiment, the debug information is stored in a PDB file. If during an attempt to add the executable to the Executable pane 314 a PDB file is not found by the analyzer 106, the developer 112 is prompted to specify the location of the PDB file. Once an executable has been added to the Executable pane 314, the developer 112 can set the trace control information using the available trace options described below.

To use the online mode to trace an executable 314 that is not currently running, the developer selects an executable file to run as the client 102. To run an executable file, the developer 112 double-clicks the <New Executable> text 365 in the executable pane 314 to open a file selection window thus allowing the developer 112 to select the required executable. Alternatively, the developer 112 can click the Run button on the toolbar 306, or select the Run option from the "Executable" menu after selecting the <New Executable> text. The file selection window provides a command line arguments text box to allow the developer 112 to specify command line arguments for the selected executable file.

After selecting an executable to be a client 102 a trace options window (as described below in connection with FIG. 5.) is displayed which allows the developer 112 to specify which functions to trace. After selecting the desired trace options and closing the trace options window, the executable starts running and BugTrapper starts tracing. As the client 102 runs, trace data is collected and the trace data are immediately displayed in the analyzer frame window 300 as shown in FIG. 3.

Figure 4:
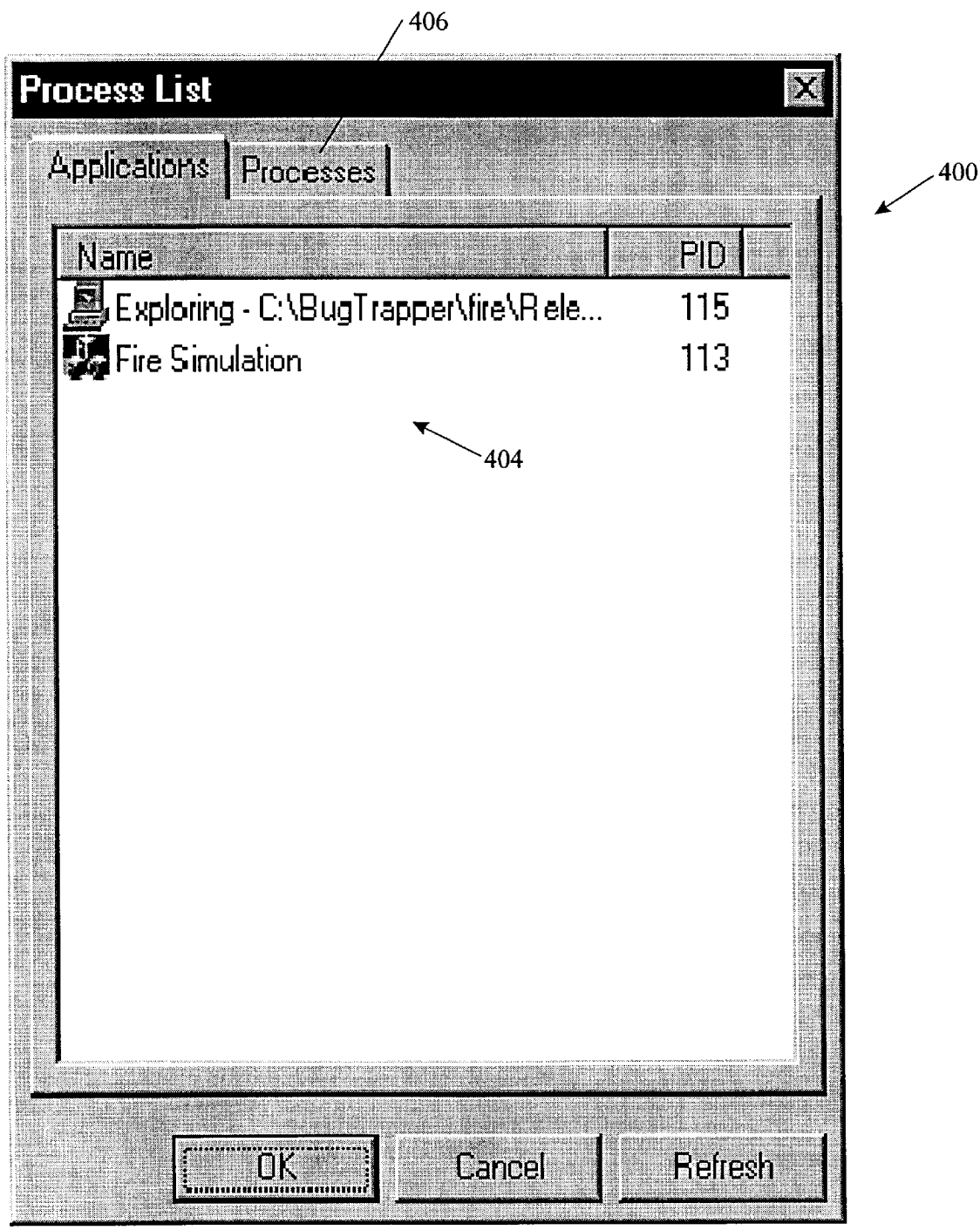
FIG. 4 illustrates a process list window that lists the processes to be traced.

To cause the analyzer 106 to trace an executable that is currently running, the developer 112 may click the "Attach" button on the toolbar 306 after selecting the <New Executable> text. Upon clicking the "Attach" button on the toolbar 306, a process list window 400 is displayed, as shown in FIG. 4. The process list window 400 displays either an applications list 402 or a process list (not shown). One skilled in the art will understand that, according to the Windows operating system, an application is a process that is attached to a top level window. The applications list 402 displays a list of all of the applications that are currently running. The process list window 400 also provides a process list, which is a list of the processes that are currently running. The applications list 402 is selected for display by an applications list tab and the process list is selected for display by pressing the applications list tab. To select a process from the process list window, the developer 112 clicks the Applications tab or the Processes tab as required, and then selects the application or process to be traced. The process list window 400 also provides a refresh button to refresh the application list and the process list, and an OK button to close the process list window 400.

Figure 5:
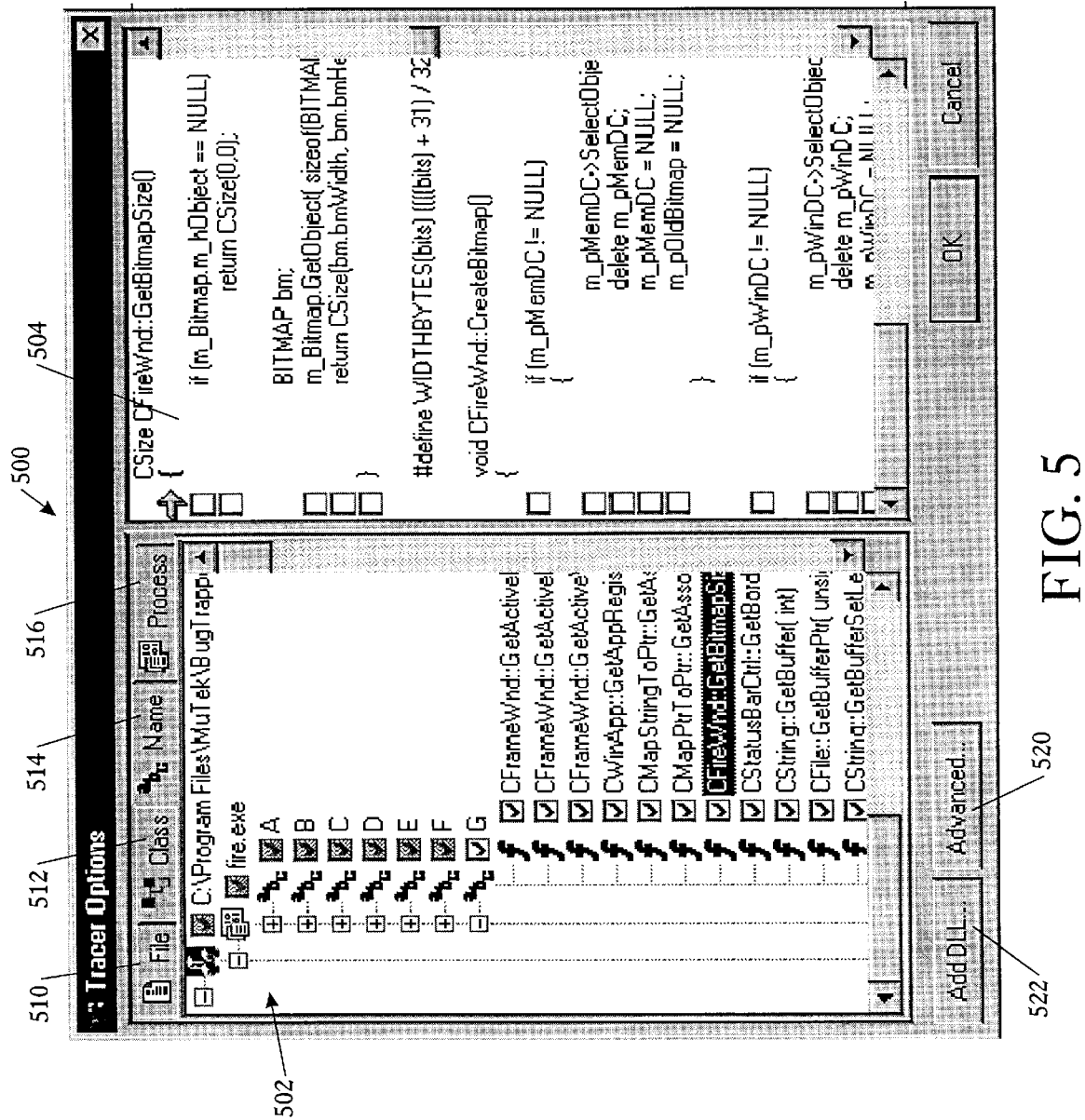
FIG. 5 illustrates the trace options window that allows a developer to select the functions to be traced and the information to be collected during the trace.
Figure 6:
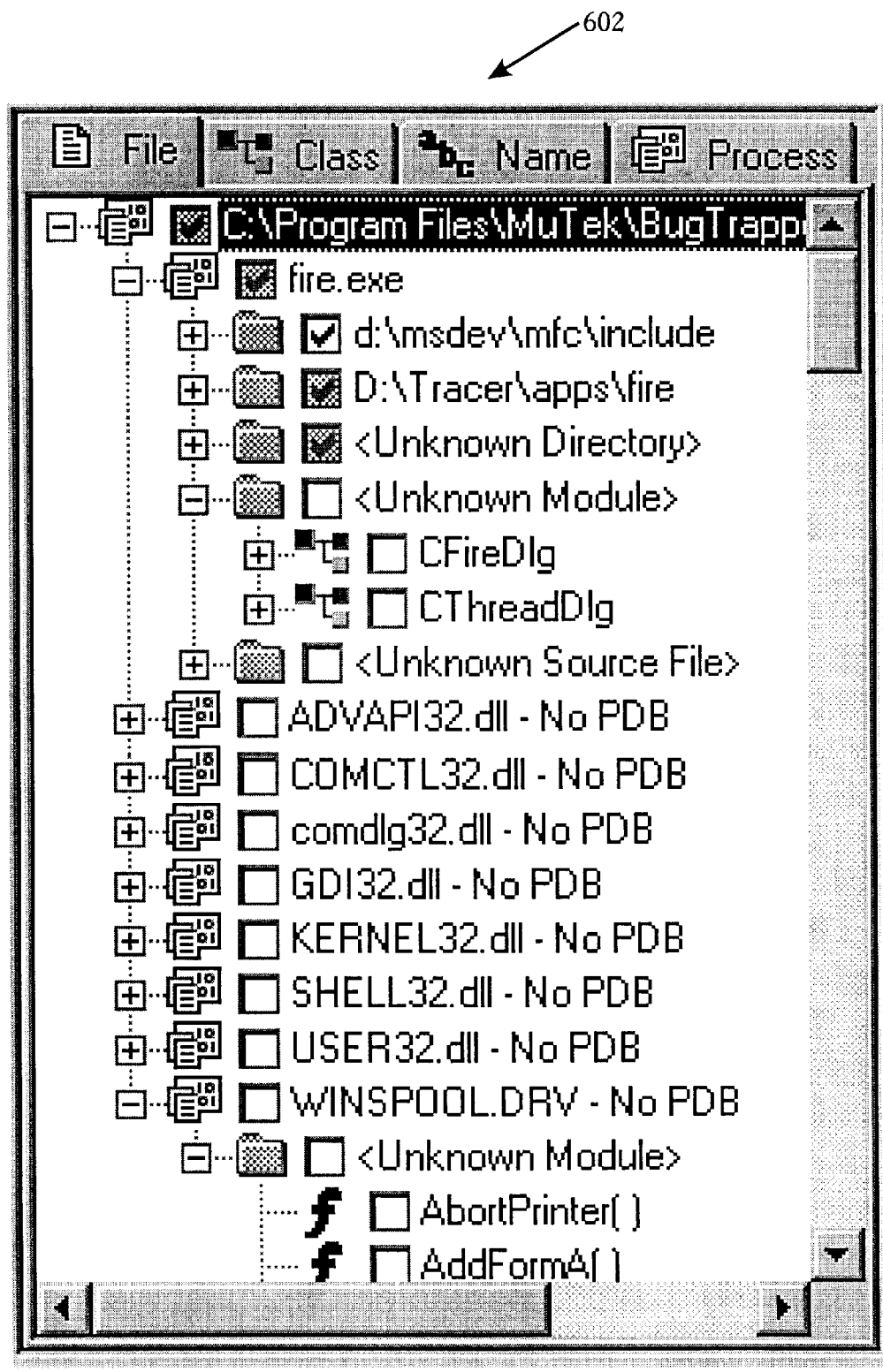
FIG. 6 illustrates a file page window that provides a hierarchical tree of trace objects listed according to hierarchical level.

After the developer 112 selects an application or process using the process list window 400, and closes the process list window 400, the analyzer 106 displays a trace options window 500, as shown in FIG. 6. below. The application or process selected in the process list window 400 becomes the client 102. The analyzer 106 can display trace data for multiple processes and applications (multiple clients); however, for the sake of simplicity, the operation of the analyzer 106 is described below primarily in terms of a single client 102. The trace options window 500 allows the developer 112 to select the functions to be traced. Selecting trace options is described below in the text in connection with FIG. 5. After selecting trace options and closing the trace options window 500, the client-side trace library 125 is attached to the client 102, and the client 102 continues to run. The client-side trace library 125 thereafter collects trace information that reflects the execution of the client 102 and sends the trace information to the analyzer 106 for display.

The developer can also add an executable file (e.g. a windows .exe file) to the executable pane 314 without actually running the executable file. To add an executable that is not currently running (and which is not to be run yet) to the executable pane 314, the developer 112 selects the <New Executable> text 365 and then clicks the Add button on the toolbar 306, whereupon a file selection window is displayed. The developer 112 uses the file selection window to select the desired executable and closes the file selection window. The file selection window provides a text field to allow the developer to enter command line arguments for the executable. Upon closing the file selection window, the trace options window 500 is displayed which enables the developer 112 to select the functions to trace. After selecting trace options and closing the trace options window, the selected executable is inserted into the Executable pane 314 with the status "Inactive." The developer can then begin a trace on the inactive executable by selecting the executable in the executable pane 314 and clicking the "Run" or "Attach" buttons on the toolbar 306.

In a preferred embodiment, the developer 112 can only create a new TCI file 120 when the executable list 361 contains the names of one or more executable files. To create a TCI file 120, the developer 112 selects "Save" from the "File" menu. The developer can also open a previously saved TCI file 120 and then modify the TCI file 120 using the trace options window 500. Once a TCI file 120 has been created (or opened) the developer 112 can select an executable from the executable pane and click the "Run" or "Attach" button from the toolbar to start tracing.

Figure 7:
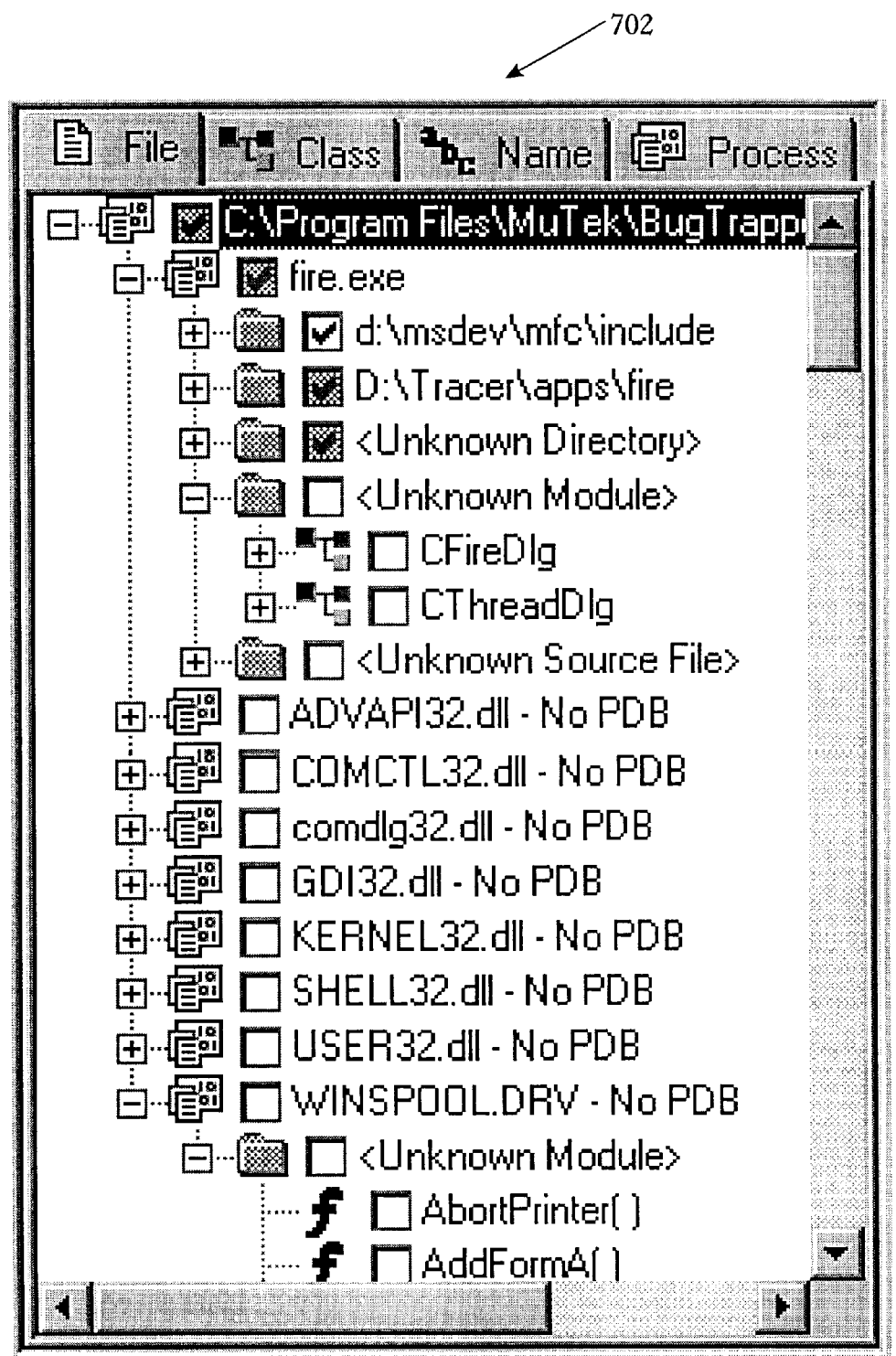
FIG. 7 illustrates a class page window that provides a hierarchical tree of trace objects sorted by class.
Figure 8:
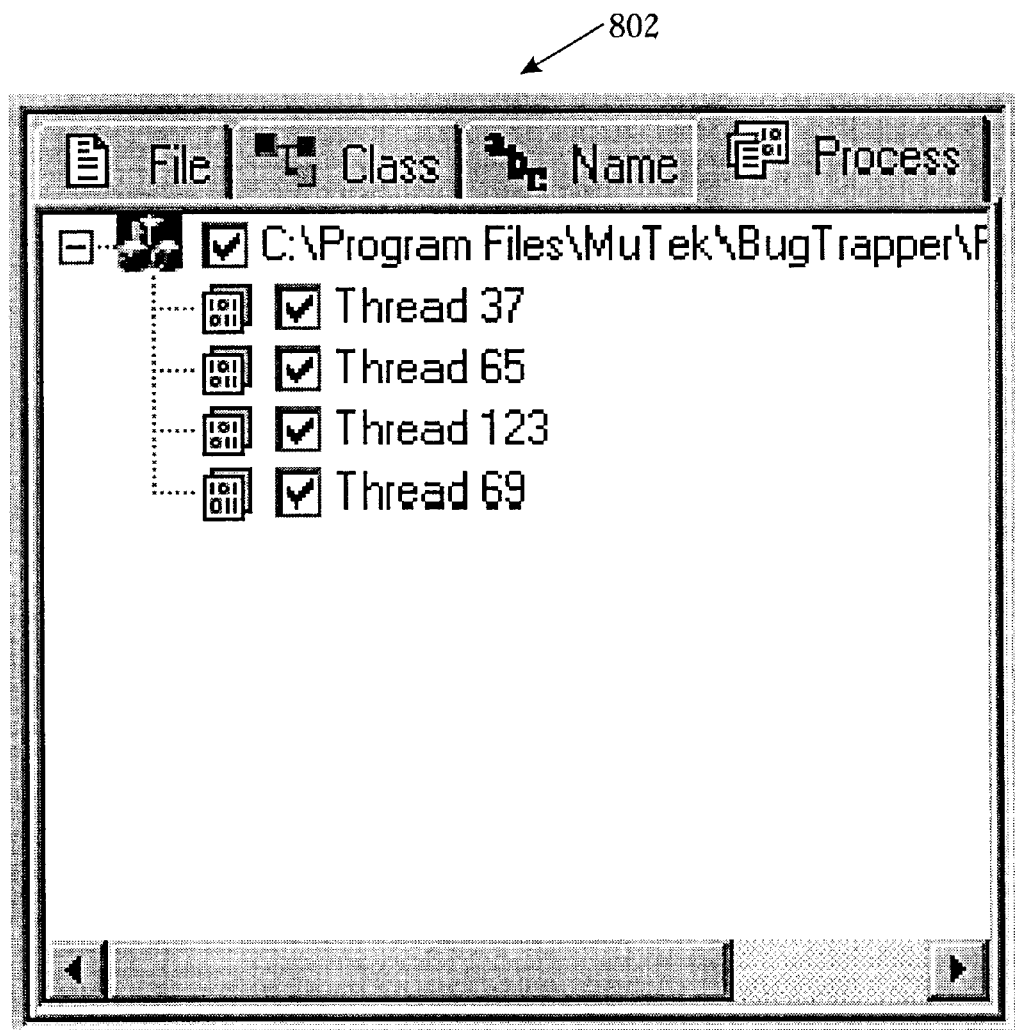
FIG. 8 illustrates the process page window that provides a hierarchical tree that displays the traced process, and the threads for each process.

FIG. 5 illustrates the trace options window 500. The trace options window 500 is divided into two panes, a filter tree pane 501 and a source code pane 504. The filter tree pane 501 is a multi-page pane having four pages: a file page 602 which is selected by a file tab 510; a class page 702 which is selected by a class tab 512; a name page 502 which is selected by a name tab 514; and a process page 802 which is selected by a process tab 516. The name page 502 is shown in FIG. 5. The file page 602 is shown in FIG. 6, the class page 702 is shown in FIG. 7, and the process page 802 is shown in FIG. 8. The trace options window also provides an "advanced" button 520 and an "add DLL" button 522.

The trace options window 500 allows the developer 112 to specify which functions to trace and what to display in the trace tree 330. The trace options window 502 allows the developer 112 to filter out functions which have already been traced. These functions will be redisplayed where they were traced if they are later re-select for tracing. If a function is not selected for tracing in the trace options window 500, it will not be displayed in the trace tree 330. If a function that was not traced is filtered in again, it will not appear in that portion of the information that has already been displayed.

For example, consider the following C++ program:

```
f1 () {}
f2 () {}
main () {
    while (1) {
        getchar (c);
        f1();
        f2();
    }
}
```

Using the above program as an example of a client 102, and assuming that the user forms the following steps:

1. Select the functions f1, f2, and main for tracing in the trace options window 500.
2. Execute one loop and view the resulting trace.
3. Deselect (filter out) f2 for tracing in the Trace Options window 500.
4. Execute the loop again.
5. Re-select (filter in) f2 for tracing in the Trace Options window.
6. Execute the loop once more.

Figure 12:
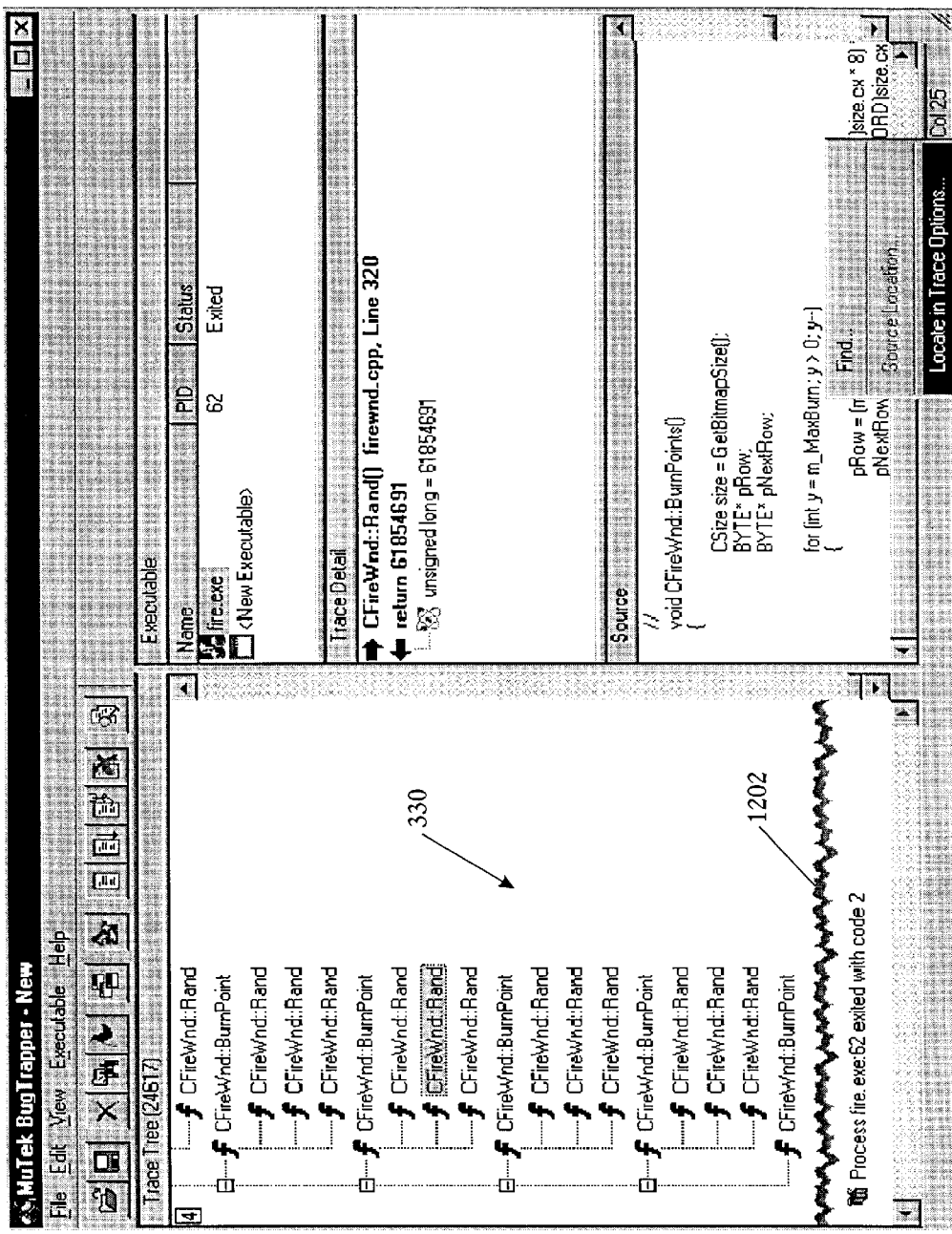
FIG. 12 illustrates a trace tree pane, showing a break (or tear) in the trace tree where tracing was stopped and then restarted.

Then, after Step 4 the following depicts the elements that are displayed in the trace window, with the symbol ~~~ representing a tear in the trace as described below in connection with FIG. 12.

 (Step 3)

After Step 6 the trace appears as follows:

In the above example, after f2 was filtered in again in step 5, it was restored in the first portion of the trace because filtering out occurred after this portion had already been executed. However, f2 never returned to the second portion, which was executed after f2 had been filtered out. Therefore, changing the trace options also determines which of the functions that have already been traced will be displayed. If a traced function is then filtered out from the trace, it can later be filtered in again.

In the filter tree pane 501, the process tab 516, corresponding to the process page 802, is not displayed prior to activating a process. Each of the four pages in the filter tree pane 501 displays a tree that the developer 112 can use to select the functions to be traced and analyzed. The source code pane 504 displays a source code fragment that contains the source code for the selected function and enables the developer 112 to select the specific source lines to be traced. Each line of executable source in the source code pane 504 is provided with a check box displayed along the left edge of the pane 504. The developer 112 checks the box to select the corresponding source line for tracing.

The "advanced" button 520 opens a window which allows the developer 112 to specify which elements to display during the trace (e.g. arguments, pointers, "this" class members and return values) and the maximum string length to be traced. The add DLL button 522 opens a window which allows the developer 112 to specify DLL files to be traced. This is useful when a DLL is loaded dynamically, as described below.

The developer 112 uses the filter tree pane 501 to select functions to be traced. Four page selection tabs at the top of the filter tree pane 501 enable the developer 112 to view the functions classified (sorted) according to file (on the file page 602), class (on the class page 702), name (on the name page 502) or process (on the process page 802). The way the functions are organized is different for each classification tab. However, the tree structure that is displayed in each of the four pages operates in the same way, even though the data elements in the tree are different for each page. Thus, the following discussion relating to the filter tree applies to any of the four pages of the filter tree pane 502.

The filter tree is a tree of function names with check boxes to the left of each name. Function check boxes appear blank, checked or dimmed as follows:

Blank: No sub-element of this branch is checked.

Checked: All sub-elements of this branch are checked.

Dimmed: Some (but not all) sub-elements of this branch are checked.

The developer 112 uses the check boxes to selected the functions to trace and then closes the trace options window by clicking an OK button.

The file page 602, shown in FIG. 6, provides a hierarchical tree that lists the objects according to their hierarchical level in the following order:

+ The Process that is traced.
+ The executable and DLL files which comprise the process.
+ Static Libraries
+ Source file directories.
+ Source files residing in these directories.
+ Classes contained in each source file and functions in each source file that do not belong to any class.
+ Functions belonging to the classes.

The source file structure is taken from the debug information (e.g., .PDB) files 121 for the client 102. If the full path name of the source file is not contained in the .PDB file, then the functions contained in that source file are located in a separate branch of the trace tree 330 under the title <Unknown Directory>. Functions that are included in the .PDB file, but whose source file is unknown, are located in a separate branch of the trace tree 330 under the title <Unknown Source File>.

The class page 702, shown in FIG. 7, provides a hierarchical tree that lists the trace objects sorted by class, ignoring their distribution amongst source files. Functions, which do not belong to a specific class are located in a separate branch of the trace tree 330 under the title <Functions>. The name page 502, shown in FIG. 5, provides a hierarchical tree that lists functions sorted alphabetically by name. Leading underscores and class names for methods are ignored. The process page 802, shown in FIG. 8, provides a hierarchical tree that displays each process that has been selected for tracing. Under each process is a list of the threads for that process.

DLL files that are not linked with the executable but rather are loaded dynamically (e.g. libraries loaded using the LoadLibrary system call), are not shown by default in the trace options window 500. In order to trace a dynamically loaded DLL file, the dynamically loaded DLL file should be added to the list of DLL files using the Add DLL button 522 in the Trace Options window 500. Clicking the add DLL button 522 displays a file selection window. Using the file selection window, the developer 112 then selects the required DLL file. The selected DLL file is added to the filter tree in the filter tree pane 502 of the trace options window 500.

The BugTrapper can also trace DLL files loaded by an executable, even when the executable does not contain debug information. For example, if the developer 112 writes a DLL file as an add-on (e.g., an ActiveX control) to a commercial program (e.g. Microsoft Internet Explorer), the developer 112 can activate BugTrapper on the commercial program and perform a trace on the add-on.

The BugTrapper also allows the developer 112 to specify various function attributes to be displayed in the trace detail pane 316 of the analyzer frame window 300, (shown in FIG. 3) while performing a trace. The developer 112 can choose to display arguments, pointers, "this" class members and return values. One skilled in the art will recognize that under the terminology of C++, a "This" class member is a class member that is referenced by the C++ "this" pointer. The developer 112 can also specify the maximum string length to be displayed. Selecting more options generally reduces the number of records in the trace log file and thus reduces the amount of execution time that is logged. The discussion below regarding the cyclic trace buffer provides further details of how much execution time is actually logged. The advanced button provides access to an advanced options window (not shown).

Selecting the arguments checkbox causes function arguments to be displayed in the trace detail pane 316. Selecting the "pointers" checkbox causes data to which a first level function argument of the pointer type points to be displayed. In other words, selecting the pointers checkbox causes function arguments that are pointers to be de-referenced for the display. The developer 112 may select the "this" checkbox to have "this" to have all members in a class displayed in the trace detail pane 316 when there is a call to a method which has a this pointer. The developer 112 may select the return checkbox to have function return values displayed in the trace detail pane 316.

The BugTrapper also allows the developer 112 to control tracing of specific source lines. In the source code pane 504, a checkbox is located to the left of each executable source line, which can be traced. To view the source code fragment containing a specific function, the developer 112 selects the required function in the filter tree pane 502 and the analyzer 106 displays the appropriate source code fragment in the source code pane 504. If analyzer cannot locate the source code, then the source code is not displayed and the developer 112 may press the spacebar or right-click in the source code pane 504 and select a "Source Location" command from a pop-up menu. The "Source Location" command opens a dialog box which allows the developer 112 to specify a source code file to be displayed in the source code pane 504. The appropriate source code is then displayed in the source code pane 504, as shown in FIG. 5.

To select the source code lines to trace, the developer clicks the check boxes corresponding to the desired lines. To select multiple lines, the developer 112 can either press CTRL+A to select the whole source code file, or drag the mouse along several lines and thereby select a group of lines. The developer 112 can then click on any checkbox in the selected area to check all the selected lines or click on a checkbox that is already checked to deselect all selected the lines. If lines of code in a file are selected for tracing, then the filename is displayed in blue. The developer 112 may also select which variables (e.g., local variables, global variables, static variables, etc.) should be traced for each traced line.

If a client 102 is modified and recompiled, it may not be desirable to use an existing TCI file for that client 102 (for example, a function that was selected for tracing may have been from the modified and recompiled version). Whenever the BugTrapper encounters an outdated TCI file 122, it issues a warning and then continues to trace based on a heuristic algorithm, which attempts to match the trace instructions to the modified client executable. Trace information for an application that may be recompiled at some future date can be supplemented by saving the trace information to an Extended Trace Control Information (TCE) file rather than a regular TCI file 120. The TCE file contains extra symbolic information (such as function names) that is not part of a regular TCI file 120. Using the extra symbolic information greatly increases the chances that the heuristic trace algorithm will produce the desired results. It is especially desirable to use a TCE file at the user 102 site when the client 102 is frequently modified, and the developer 112 does not want to redefine the trace options after each compilation. The TCE file is identified by a .TCE extension.

The developer may save a TCI file 120 by clicking the save button on the toolbar 306, whereupon the trace control information is saved. The first time that information is saved to a new TCI file 120, a file selection window appears. In the file selection window, the developer 112 may select the type of file (TCI or TCE) in a "Save as" type box.

The TCI file 120 can be used to trace a local client 102 at a later time, or it can be sent to a user 110 for use with the agent 104 to trace a client 102 at a remote site. In a preferred embodiment, for remote tracing, the developer 112 sends the user 110 a self-extracting zip file that contains the agent 104 and the TCI file 120.

Using the Agent

As described above, the agent 104 is an executable module which the developer 112 can provide to a user 110 along with a Trace Control Information (TCI) file in order to trace a client 102. The trace data collected by the agent 104 are written to the trace log file 122 which the user sends to the developer 112. The developer 112 uses the analyzer 106 to view the contents of the trace log file and analyze the trace information in the log file 122. Trace analysis using the analyzer 106 is discussed in subsequent sections of this disclosure. The present section discusses the procedures for starting the agent 104, including the first step performed by the user 110 to run the agent 104. The present section also discloses techniques for selecting the TCI file 120, specifying a directory for the trace log file 122, specifying the client 102, and, finally, using the agent 104 to control the logging of trace data The agent 104 is an easy-to-run standalone application, with step-by-step instructions provided on the screen. To trace an application, the user 102 needs both the agent 104 and the TCI file 120. The TCI file 120 is prepared, as described above, by the developer 112 and contains information about the client 102 and the specific functions to be traced.

In a preferred embodiment, the developer supplies the agent 104 as a self extracting zip file that can be installed by simply double clicking on the zip file name. At the end of the installation, the user 110 can launch the agent 102. When the agent 102 is launched, it displays a TCI select window (not shown) which is a conventional file select dialog that allows the user to select the TCI file 120. Likewise, the agent 104 provides a log file window, which allows the user 110 to select a directory for the log file 122. The default log file is the last log file that was opened by the agent 104. The next step in using the agent 104 is to specify the client 102 executable(s) to trace.

Figure 9:
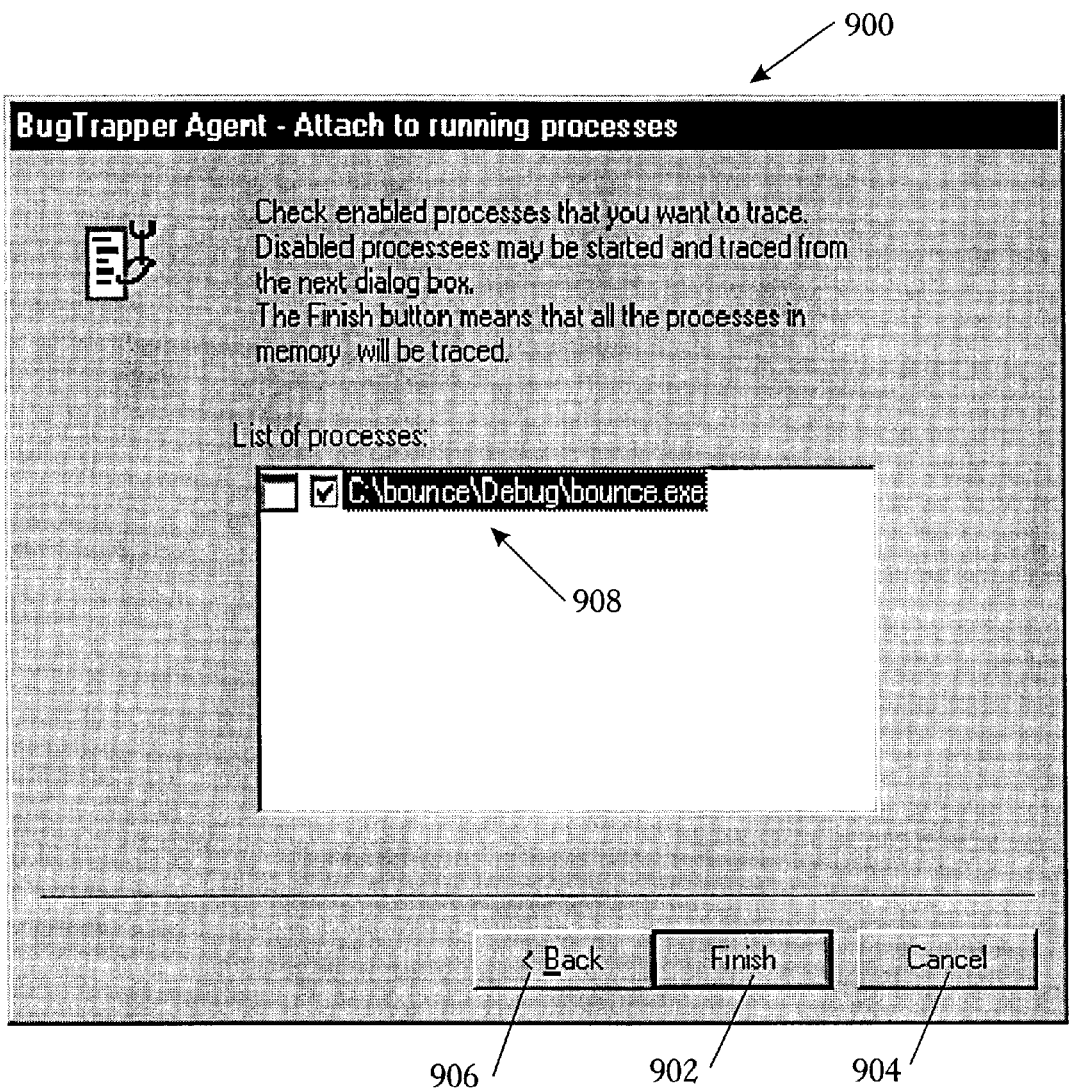
FIG. 9 illustrates the running process window that allows the user to attach to and start tracing a process that is already running.

If an executable specified in the TCI file 120 is already running, an attach to running processes window (running window) 900 is displayed, as shown in FIG. 9. The running window 900 provides a finish button 902, a cancel button 904, a back button 906, and a list of processes 908. The list of processes 908 shows any currently running processes that are specified in the TCI file 120. The list of processes 908 shows all processes that are specified in the TCI file 120 that are not currently running as disabled (grayed). The running window 900 allows the user 102 to select a currently running process to trace by selecting items in the list 908. Preferably, the user 110 will deselect any executables that are to be re-run from the start (that is, when the user does not want to attach to an executable that is already running). To select a running process, the user 110 selects a process from the list 908, and then presses the finish button 902 to cause the BugTrapper to attach to the client processes and starts to collect trace data.

Figure 10:
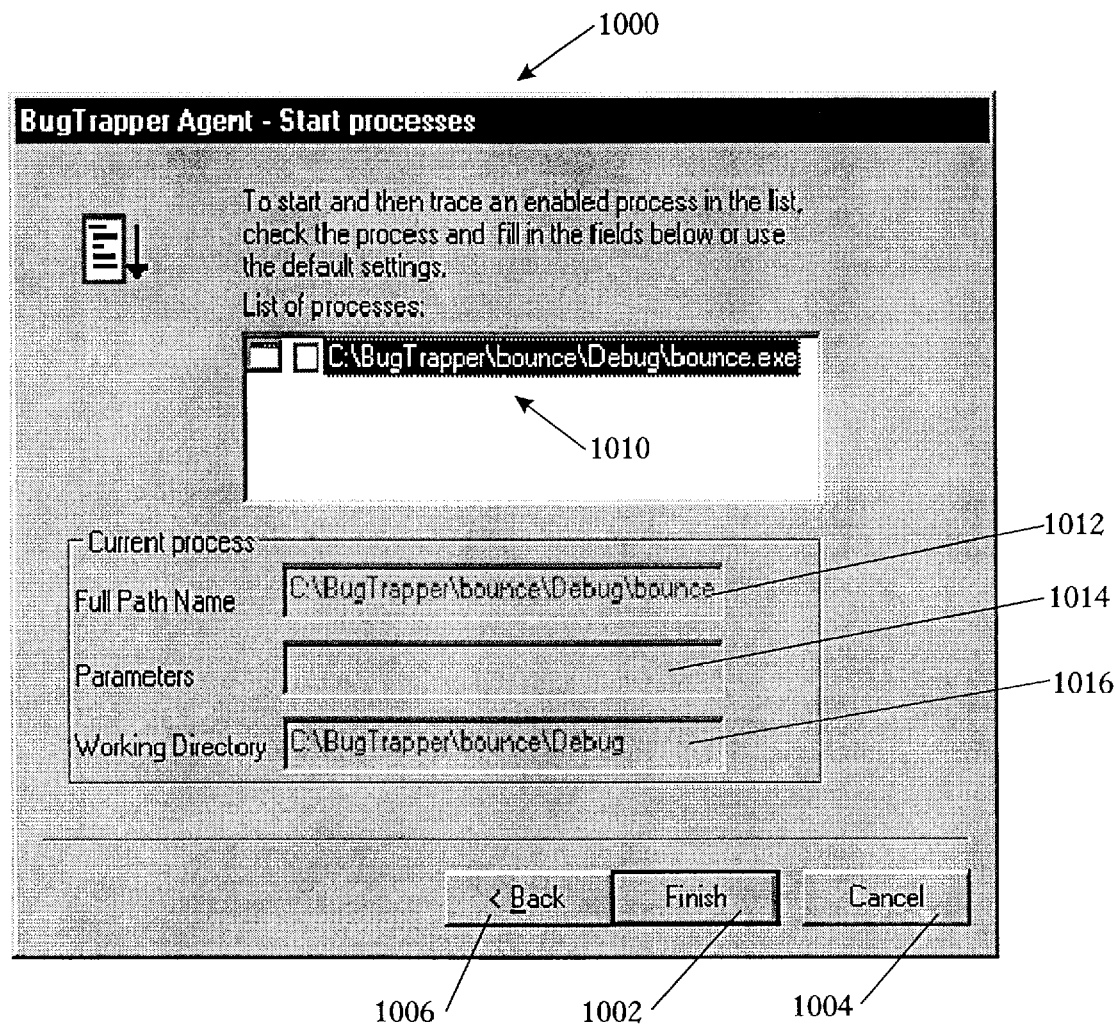
FIG. 10 illustrates the start process window that allows the user to load an executable file, attach to the loaded file, execute the loaded file, and start tracing the loaded file.

If an executable specified in the TCI file is not currently running, then a start processes window (start window) 1000 is displayed, as shown in FIG. 10,. The start window 1000 provides a finish button 1002, a cancel button 1004, a back button 1006, and a list of executable files 1010. The start window 1000 also provides a path field 1012, a parameters field 1014, and a directory field 1016. The list of files 1010 shows any currently running processes that are specified in the TCI file. The start window 1000 allows the user to specify executables that are not currently running to be traced. The agent 104 will run the selected client(s) 102 and trace them according to the information in the TCI file 120.

The file list 1010 displays the executables, which are listed in the TCI file. Each item in the file list 1010 is provided with a check box. To specify the executables to run, the user 102 checks the boxes for the desired executables in the file list 1010. If the file path in the file list 1010 is not correct, then the user may enter the correct file path in the path field 1012. The user 110 may also add command line arguments in the parameters field 1014. The file path and command line steps may be repeated as needed to specify the file path and commands for additional executables. When the finish button 1002 is clicked, an agent window (described below) is displayed and the agent 104 runs the specified executables, attaches to the executable processes, and starts tracing.

The agent window (not shown) is displayed by the agent 104. The agent window displays the names of the TCI file and the log file. The agent window also contains an animated icon whose movement indicates whether trace data is currently being collected while the client 102 is running. The agent window also contains: a "Start/Stop" button to start or stop the trace; a "Clear" button to clear the trace buffer 105, a "Dump" button to save the contents of trace buffer 105 to the log file; and an "Exit" button to exit the agent 104.

The "Stop/Start" button allows the user 110 to stop and restart tracing when desired. Stopping the trace may improve system performance. The "Start/Stop" button toggles between Stop and Start according to the tracing status. The animated icon moves when tracing is in progress. The "Clear" button allows the user 110 to clear the trace buffer 105. The cleared information is not stored in the log file 122 unless the user first uses the dump button. The dump button allows the user 110 to save the contents of the trace buffer 105 to the log file 122. On the first save after a new process had been started, the agent 104 overwrites the old log file 122 (if one exists). On subsequent saves, new information will be appended to the existing log file 122. Clicking the exit button causes the agent 104 to exit. Upon exiting, the trace buffer is written to the log file. Note that the trace information is written to the log file when either dump or exit is clicked and also when the traced application crashes or terminates. The user 110 will preferably use the dump button frequently if it appears likely that the entire operating system may crash.

In one embodiment, the user may select to write every trace line to the disk as it is traced, or, the user may select to write trace lines periodically every N seconds. Such writing is useful, for example, when it appears likely that the entire operating system may crash.

Analysis of the Trace Information

The analyzer 106 is used to analyze a trace, either online as an application runs or off-line using a remote trace log. The general topics that fall under the rubric of trace analysis include, starting an online trace, opening a previously saved trace log file, viewing trace information, interpreting the trace information, working with trace information, and additional trace functions that are available when performing an online trace.

The BugTrapper allows the developer 112 to trace a client 102 executable in order to pinpoint an element in the client 102 code that causes a bug. The primary device for displaying trace information in the analyzer 106 is the trace tree 330 in the trace tree pane 310 shown in FIG. 3. The trace control information (TCI) filters can be modified during trace analysis to filter out some of the available trace data according to the needs of the developer 112.

Analysis of a remote trace (or a previously saved online trace) is started by opening a previously saved trace log file and displaying the trace information that it contains in the trace tree pane 310. The log file 122 may either have been created by saving trace information using the analyzer 106, or the log file 122 may have been created at a remote location using the agent 104. A trace log file 122 is opened by using an "Open Log" command from the "File" pull down menu found on the menu bar 304. Once a trace log file 122 is open, the title bar 302 displays the name and path of the opened log file 122. Once a trace log file 122 is open, the developer can view the trace information using various panes in the analyzer frame window 300. Trace information is displayed in the trace tree pane 310, the trace detail pane 316, and the source pane 318.

The trace tree 330, in the trace tree pane 310, is a hierarchical tree showing trace data collected from the client 102. Trace data includes information about events that took place during execution of the client 102, including function calls, function returns, selected source lines, etc. The developer 112 can use the mouse to choose any function from the trace tree, whereupon the arguments and return values for the chosen function are shown in the trace detail pane 316, and the source for the chosen function is displayed in the source pane 318. The types of trace information displayed for both online traces and a trace from log files is almost identical, however the log file trace provides a static display, while the online trace is dynamic and can be viewed as the trace information is being collected.

The trace tree 330 displays a hierarchical tree of the sequence of function calls and returns in the client 102. The number of lines in the trace tree is shown in the trace tree pane title bar 308. The trace tree 330 is organized in a standard tree structure and the developer 112 can click on the tree control buttons to collapse or expand the view of functions belonging to lower hierarchical levels. Clicking on a function or a source line in the trace tree pane 310 causes the trace detail pane 316 and the source pane 318 to change to display information relevant to the function. Selecting a function in the trace tree 330 and pressing the delete button on the keyboard removes the selected function from the trace. This is equivalent to filtering the function out of the trace.

The trace data is written to a buffer in memory called the trace buffer 105, and from there either displayed in the trace tree pane 310 (when performing an online trace) or written to a log file (when performing a remote trace). The trace buffer 105 is organized as a circular buffer of fixed size. The size of the trace buffer 105 can be set by the developer 112. When the trace buffer 105 is fill, new trace records overwrite the oldest records contained in the buffer 105. One skilled in the art will recognize that other buffering methods can be used without changing the scope of the present invention. For example, the trace information could be stored in a buffer, which simply added trace records without overwriting old records. In a preferred embodiment, loss of old data is acceptable because, when the client 102 malfunctions, the developer 112 is usually interested in the most recent records prior to the malfunction. Thus, there is usually little need to keep all of the records, especially the oldest ones. The size of the trace buffer 105 is set so that it will be big enough to hold a large number of records without consuming too many system resources. Typically, 20,000 to 40,000 records are kept.

When the trace buffer 105 is written to a log file 122, the trace records are preferably appended to the end of the log file 122. In a log file, old records are not deleted, and the trace size is limited only by the available disk space.

Alternatively, when tracing online, the trace tree is actually an image of the trace buffer 105. Because of this, the trace tree will not display more records than the trace buffer 105 contains, so old records are deleted ("scrolled out" of the display). The rows counter at the top of the trace tree pane 310 indicates the number of records in the trace buffer 105 and the number of rows in the trace tree. Because the buffer 105 is circular, the number of rows in the trace tree 330 continuously grows during the beginning of the tracing process until the buffer wraps (typically 20,000 to 40,000 records). Thereafter, the number remains approximately at the same level as old records are overwritten with new records. The exact number of records that are kept in the trace buffer 105 depends on the size of the trace records. The size of each trace record is determined by the TCI options specified by the developer 112. For example, if the developer 112 requires tracing of "this" class members, the size of the records will increase and the number of records in the buffer will decrease.

The analyzer 106 and the agent 104 can trace a multi-threaded and multi- processed client 102. When tracing a multi-threaded process, different threads are separated from each other in the trace tree pane 310 by a thread caption bar 320. For multi-process applications, similar horizontal bars, called process caption bars (not shown), separate trace lines belonging to different processes. The thread caption bar 320 and the process caption bar separate the trace tree 330 into sections. These caption bars represent a context switch in the application, between threads and between processes. Process caption bars are similar to the thread caption bar 320, therefore any future mention of threads also applies to processes in multi-process applications.

The thread caption bar 320 contains a name field, a process ID number field, and a thread ID number field 321. Within the trace tree 330 itself, there is an up arrow at the top of each section, and a down arrow at the bottom of each section. Clicking the up arrow causes the displayed trace tree 330 to jump to the previous point in the trace tree 330 where the thread gained control. Clicking the down arrow causes the displayed trace tree 330 to jump to the next point in the trace tree 330 where the thread gains control. The trace tree 330 also provides an expand/collapse control button 326 to allow the developer 112 to expand and collapse the current thread view. The trace tree pane 310 also provides a vertical scroll bar for scrolling up and down through the trace tree 330. When the trace tree pane 310 is scrolled up or down to a section containing functions of lower hierarchical levels, the portion of the trace tree 330 displayed in the window is shifted leftwards. The depth of this shift, with respect to the first function called in the process, is indicated by a stack level indicator 328 appearing in a rectangle in the upper left corner under the thread caption bar 320 (as shown in FIG. 3).

Figure 11:
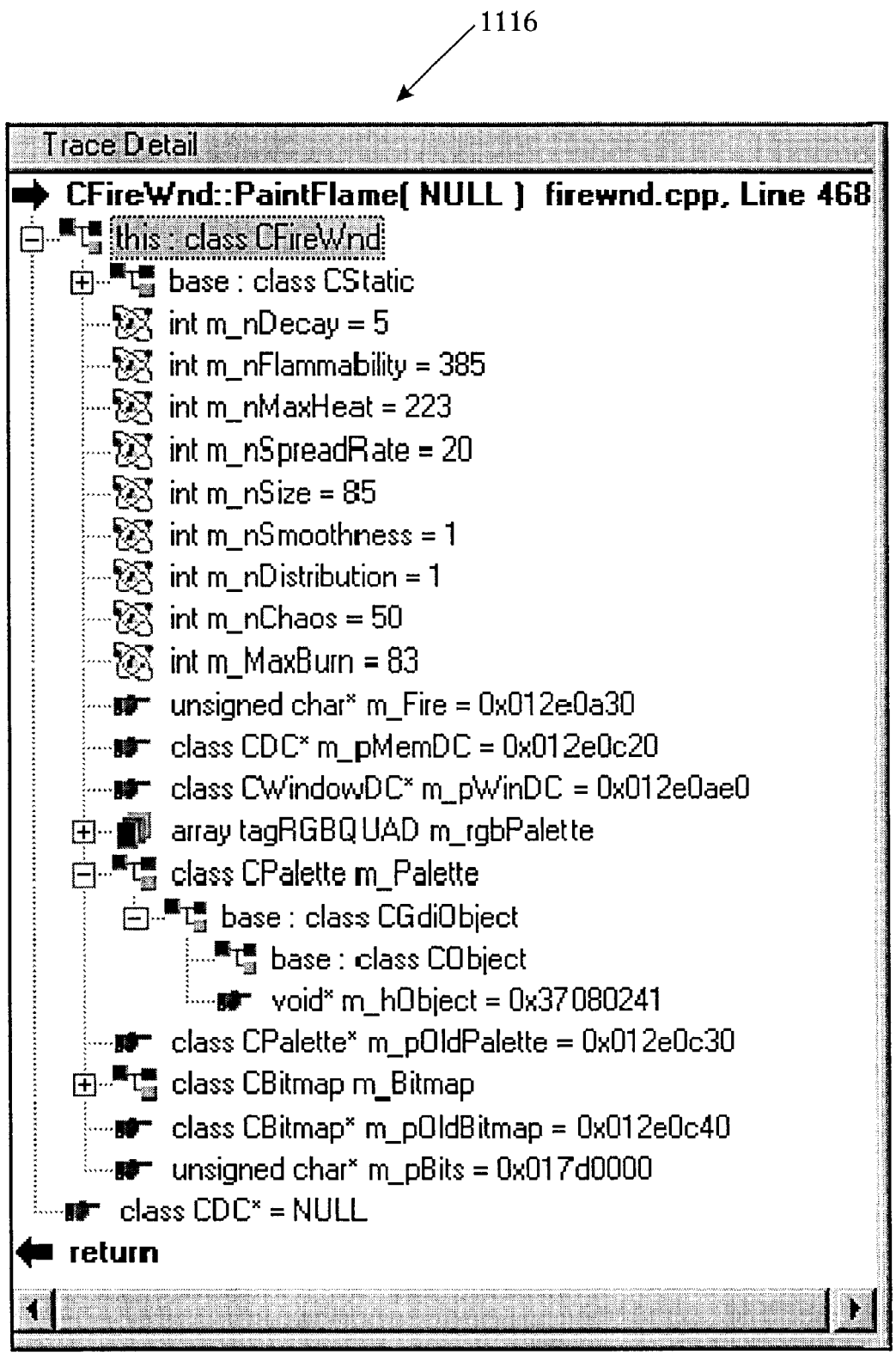
FIG. 11 shows a trace detail pane that displays a C++ class having several members and methods, a class derived from another classes, and classes as members of a class.

The trace detail pane 316 shows available details describing the function selected in the trace tree view. FIG. 11 shows a trace detail pane 1116 that displays a C++ class having several members and methods, a class derived from another classes, and classes as members of a class. The trace details are displayed in a trace detail tree 350 which is a hierarchical tree structure. A right arrow 351 in the trace detail pane 316 marks where the function is called. A left arrow at the bottom of the detail tree 350 marks where the function returned to its caller. Some of the data that can be displayed (such as the arguments) are only displayed if an option is selected in the advanced trace options. If an argument in the call window of a function is of the aggregate type, the argument's components will be displayed beneath the right arrow 351 in the form of a hierarchy tree. If an argument is of the pointer type, and pointers were selected in the advanced trace options, then the value displayed in the trace detail tree 350 will be that of the data to which the pointer points. However, for pointer fields that reside within arguments, only the address contained in the pointer will be displayed. In other words, in the preferred embodiment, the pointer is de-referenced only for the first level arguments. One skilled in the art will understand that other pointers could be de-referenced as well, and that the trace detail tree 350 could display the value pointed to by arguments deeper than the first level.

In one embodiment, the trace detail pane 316 also shows time stamps. The time stamps display the time that a function is called and the time that the function returns to its caller.

If the argument is an array of known size, then the elements of the array will be displayed. If the array size is unknown, then the value displayed is the value of the first array element. If the argument is of character pointer type, then the string value is displayed. If the argument is numeric, then the decimal, hex, or decimal and hex values are displayed, depending on the selection made in the advanced trace options. Right-clicking the mouse when it points in the trace detail pane 316 displays a popup menu which allows the developer 112 to select how numeric arguments are displayed (as decimal, hex, or decimal and hex values).

The source pane 318 shows the source code for the selected function or source line selected in the trace tree 330. The source code listed in the source pane 318 is automatically scrolled to the location of the selected object, if possible. The line in the source code is displayed in bold and is pointed to by an arrow. The analyzer 106 looks for the source file in the current directory and in the directory indicated in the .PDB file. If the source file is not found, the source pane remains blank. In this case, the developer 112 can change the source file search path in order to display the source code. To change the source file path the developer should select a function in the trace tree 330, then right-click in the source pane to open a pop-up menu, and then select the "Source Location" from the pop-up menu. Alternatively, the developer 112 can add additional source directories and remove source directories by selecting the "Options" command from the "View" menu on the menu bar 304. Source file paths can also be removed.

The analyzer 106 provides several features which make it easier to analyze trace information and pinpoint a bug in the client 102. These features can be used both while performing an online trace and while viewing trace information from a remote log file 122. Analysis features include: saving trace information to a log file 122; printing the trace tree 350; searching for trace elements; locating a function in the trace options window 500; filtering the trace information; adding, editing, deleting and locating bookmarks; clearing the trace tree pane; and displaying multiple windows. Additional features available for online tracing include saving trace information to the log file 122.

The "Find" button on the toolbar 306 is used to initiate a search for an element in the trace tree 330. Clicking the Find button opens a "Find what" dialog box in which the developer 112 can enter a search text string. The find what dialog provides a "Find Next" button to start a search for the occurrence of the specified search text. The first occurrence of the specified text is highlighted in the relevant pane. Functions in the source code displayed in source pane 318 can be located in the trace options dialog 500 by right-clicking inside the source code in the source pane 318. The right-click opens a pop-up menu. The developer then selects a "Locate in Trace Options" command from the pop-up menu to open the trace options window 500. The trace options window 500 will open with the desired function displayed and highlighted.

The trace filter previously described in the text relating to FIG. 5 is a tool that enables the developer 112 to select the functions to trace. When using the trace filter to change the display while performing an online trace, the trace continues in the background, and when the developer 112 closes the trace options window 500 the new filter is applied to the display in the trace window 300. The developer 112 can also use the trace options window 500 to change the display while performing an off-line trace. This enables the developer 112 to filter out traced elements and display a subset of the traced information. The information contained in the log file is not modified, only the display changes.

A bookmark allows the developer 112 to mark trace lines (functions or source lines) in the trace tree 330. The developer 112 can also edit the name of a bookmark or delete the bookmark it as required. Bookmarks are inserted in the trace tree 330 by using the bookmark button on the toolbar 306. Bookmarks allow easy jumps to the bookmarked element. To insert a bookmark in the trace tree 330, the developer will: select the trace line (a function or source line in the trace tree 330) to mark; press the bookmark button to open the bookmark window; type the bookmark name in the bookmark widow; and click the OK button. A waiving flag icon 332 appears on the left of the bookmarked trace line in the trace tree 330. The bookmark name is displayed whenever the cursor is placed over the bookmarked line. To change a bookmark name, the developer 112 repeats the steps to create a bookmark. To delete a bookmark from the trace tree 300, the developer 112 can press a delete button on the bookmark window. The "Goto Bookmark" command from the "Edit" menu is used to go to a bookmark in the trace tree 330.

Multiple instances of the analyzer 106 can be open simultaneously. Each instance can define different filter options for each window. This feature is especially useful for multi-threaded applications, where it is convenient to observe each thread in a separate window.

The analyzer 106 provides for starting and stopping of an online trace. All trace points are disabled when tracing is stopped. Stop is helpful if the trace adversely influences the application performance and it appears that the subsequent operations in the client 102 are not relevant to the problem being analyzed. The Start/Stop Tracing button on the toolbar 306 is used to toggle tracing on and off. Tracing is stopped or restarted as specified. When tracing is stopped, the boundaries of the lost tree portion appear in the trace tree pane 330 as a tear 1202, as shown in FIG. 12. When tracing is resumed, the trace tree 330 continues under the tear 1202.

Internal Implementation Details of the BugTrapper System

The sections that follow discuss various internal operational and implementation details of the agent 104, the analyzer 106, the trace libraries 124, 125, and how these elements interact with the client 102 and the operating system.

The Attaching Mechanism

One aspect of the present invention is the attaching mechanism used by the BugTrapper to collect trace information. With traditional tools, it was necessary to manually enter trace points in the application's source code, or at a minimum, even if trace points were automatically added to the source, to re-compile the source code. With BugTrapper, tracing is accomplished by attaching to the memory image of the application (i.e., the copy of the executable code that is loaded into RAM or other memory for execution). There is no need to enter trace points into, or to otherwise modify, the source, object, or executable files of the client 102 application. No special tracing version of the client 102 is needed, and the client 102 need not be written in any special manner. Attaching to the client 102 in memory allows function calls, returns, and other source lines to be traced. The attaching mechanism also allows for the tracing of any executable, including optimized (release) builds, multi-threading and multi-processes, longjumps, signals, exceptions, and recursions.

The BugTrapper client-side trace library 125 is attached to the client 102, in part, by modifying certain executable instructions of the memory image of the client 102. This process is generally called "executable code instrumentation," or simply "instrumentation." The instrumentation process is performed such that the functionality of the client 102 is preserved. Because the instrumentation is made only on the memory image, there is no need to pre-process or modify the source code or executable files of the client 102. Use of the client-side trace library 125 provides significant advantages over the prior art by eliminating the need for context switches when debugging a program. Context switching has the effect of significantly slowing down the rate of execution. The tracing implementation provided by BugTrapper can therefore be used to study the real time behavior of a program and detect bugs resulting from such behavior. Although one skilled in the art will recognize that the present invention can advantageously be used with any operating system, a preferred embodiment runs under the Windows-NT and Windows-95 operating systems supplied by Microsoft Inc. The following description of the internal details of the BugTrapper will thus be described in terms of the Windows-NT/95 operating systems with the understanding that the invention is not limited to said systems.

The trace libraries 124, 125 include a number of callable functions (discussed below). By using the callable fimctions, and system functions provided by the Win32 API (application program interface), the trace libraries performs two major tasks: (1) attaching specialty functions to application, and (2) tracing the execution of the application's executable code. Both of these tasks are described separately below. The agent-side trace library 124 is primarily responsible for attaching the client-side trace library 125 to the client 102. The agent-side trace library 124 also provides communication with the client-side library 125. The client-side trace library 125 is primarily responsible for placing data in the trace buffer 105. In the following description, the term "client process" is used to refer to the executable code of the client 102 that has been loaded into a memory space for execution. BugTrapper refers both to BugTrapper Agent or BugTrapper Analyzer, depending whether it is operating in the Online mode or the Remote mode.

The act of attaching to a currently running process is known as a Process Attach. The act of attaching to a new process, during the creation of the new process, in order to trace the new process from its start is known as a Creation Attach. In a Creation Attach it is desirable to pause the client 102 process as close as possible to its entry point so that virtually all of the functions executed by the client 102 will be traced.

In the Windows-NT and Windows-95 operating systems, each process resides at a distinct location or "address space" in memory. A DLL, such as the client-side trace library 125, which resides in another address space, cannot simply be loaded into the same address space as the client process. To overcome this limitation, BugTrapper forces the client process to load the client-side trace library 125 DLL (using a process called injection) into the process space of the client process.

Attaching to a Client Running Under Windows-NT

Figure 13:
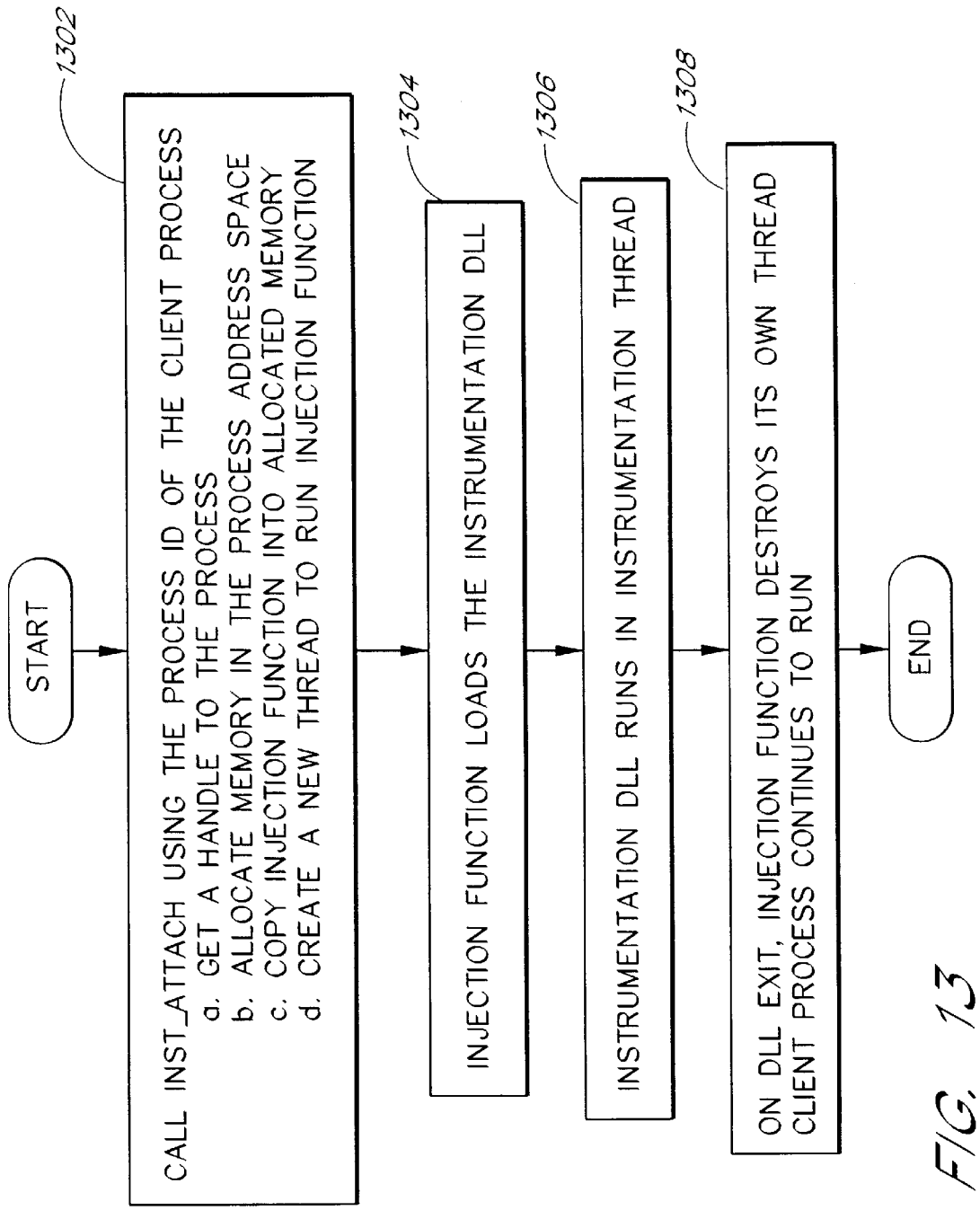
FIG. 13 is a flowchart which illustrates the process of attaching to (hooking) a running process.

In a preferred embodiment, the injection process for Process Attach in Windows-NT is accomplished by using the CreateRemoteThread() function of the Win32 API, to create a remote thread in the client process and to force the newly created thread to run code in the client process. The code that is run by the remote thread is a copy of an injection function copied to the remote thread using the Win32 API WriteProcessMemory() function. The Process Attach involves the following sequence of events shown in FIG. 13 beginning with a procedure block 1302 where the function inst_attach()of the tracing library is called in BugTrapper, using the process ID ("PID") of the client (client) process as an argument. The function inst_attach() performs the following operations:

1) It obtains a handle to the client process using OpenProcess();
2) It allocates memory in the client process's address space using the Win32 API function VirtualAllocEx();
3) It copies the code for the injection function and other various data (including the full path of the Trace Library) onto the allocated memory space using the WriteProcessMemory() function; and
4) It creates a new thread in the client process with CreateRemoteThread().

The new thread created in step 4 starts executing at the address to which the injection function was previously copied in step 3. The procedure then advances from the procedure block 1302 to a procedure block 1304 where the injection function starts running in the new thread of the client process. Using data passed to it via other parts of the memory space, the injection function loads the client-side trace library 125.

The procedure advances from the procedure block 1304 to a procedure block 1306 where the client-side trace library 125 runs in the context of the new thread while the instrumentation is taking place. The client-side trace library 125 communicates with BugTrapper (i.e., the agent-side trace library 124), handling commands, and actually performing the instrumentation.

The procedure advances from the procedure block 1306 to a procedure block 1308 where the client-side trace library 125 exits, and the injection function destroys its own thread and stops executing by calling the ExitThread() function. Unlike other debuggers that terminate the debugged process on exit, here the client 102 continues to run, without any substantial alteration to the functionality of the client 102.

Figure 14:
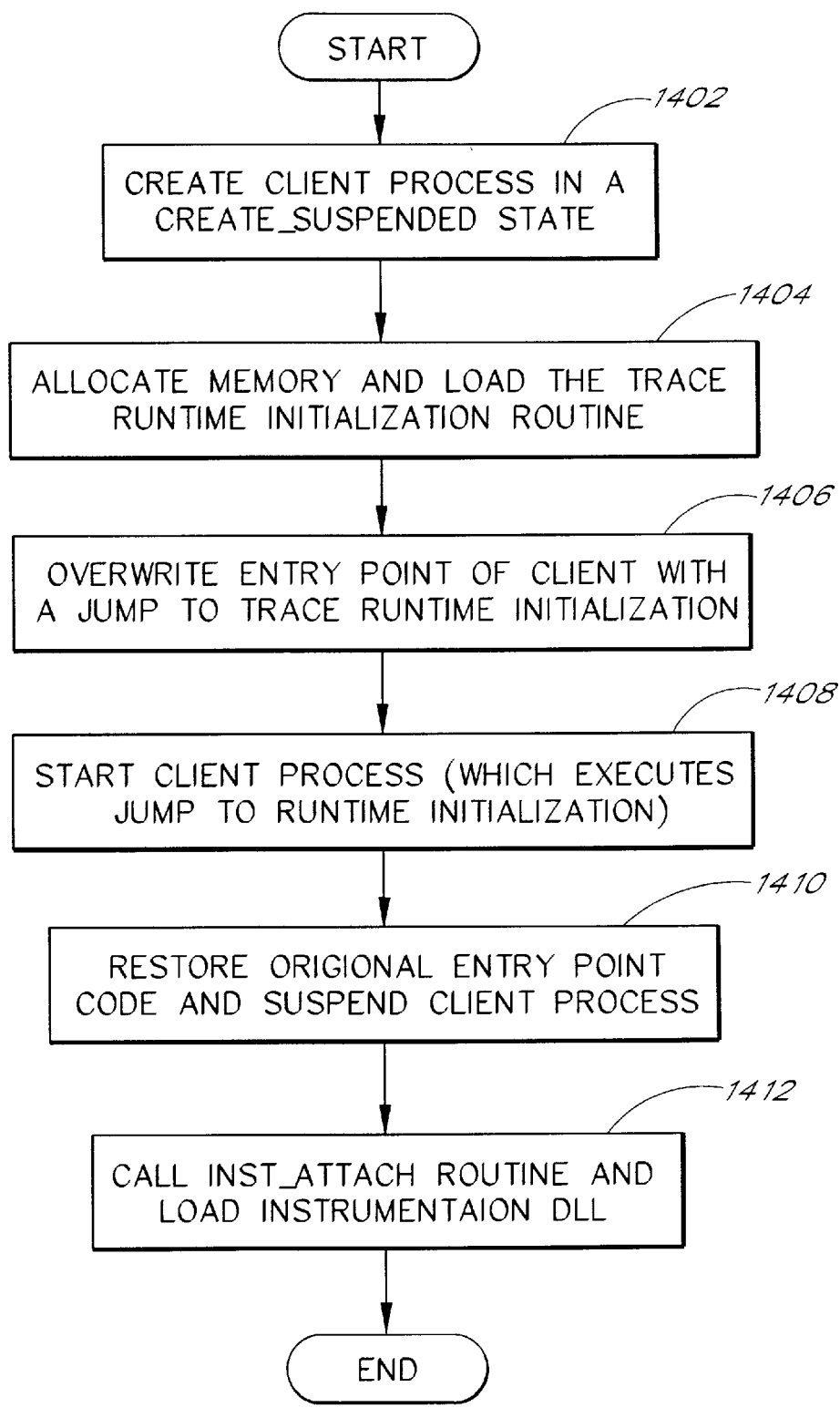
FIG. 14 is a flowchart which illustrates the process of loading an executable file and attaching to (hooking) the program.

Creation Attach is accomplished under Windows-NT by creating the client process in a suspended state, by using the CREATE_SUSPENDED flag in the CreateProcess() function. In this case, the previously described procedure cannot be used, since none of the system DLLs in the client process have been initialized. In particular, since KERNEL32.DLL is not loaded, the client-side trace library 125 cannot be loaded. The present attaching procedure overcomes this difficulty by performing the following attaching procedure, which begins at a procedure block 1402 shown in FIG. 14.

To attach to a new client 102, the attaching procedure begins in block 1402, in which the client process is created in a CREATE_SUSPENDED state. The attaching procedure then advances to a procedure block 1404. In the procedure block 1404, BugTrapper makes a call to the inst_prepare() of the agent-side trace library 124. The inst_prepare function, using WriteProcessMemory() and VirtualAllocEx(), allocates memory in the client process and copies a small assembly language code segment into the allocated space. The procedure then proceeds to a procedure block 1406 where the inst_prepare function overwrites the entry point of the client executable in the client process with a jump instruction to the new assembly code. The attaching procedure then advances to a procedure block 1408 wherein the inst_prepare function allows the client process to resume, and thereby start the initialization process for the client process. After all DLLs are initialized, including the client-side trace library 125, execution continues to the entry point of the client executable, which now contains a jump to the new assembly code. When the jump occurs, the attaching procedure advances from the procedure block 1408 to a procedure block 1410. In the procedure block 1410, the assembly code restores the original client entry point, and suspends the client process. At this point, the client process is suspended without running any executable code, but is past the initialization stage. The attaching procedure then advances to a procedure block 1412.

In the procedure block 1412, BugTrapper can now call inst_attach() to attach to the client process and start instrumenting it. When the attaching procedure is complete, it can allow the client process to resume. The assembly code simply jumps directly back to the original entry point of the client 102, and execution of the client 102 starts with the proper instrumentation.

Attaching to a Client Running Under Windows-95

In Windows-95, Process Attach and Creation Attach are implemented in a manner different from the Windows-NT manner discussed above because the CreateRemoteThread API call is not supported in this operating system.

Creation Attach under Windows-95 exploits the fact that process initialization starts from a known entry point of kernel32.dll. BugTrapper creates the client process in the suspended mode and then calls to the inst95_attach function. This function performs the following sequence of operations:

1) It initializes the communication channel for IPC with the client process.
2) It copies various data (such as the Injection Function code and the path for the client-side trace library 125) into the client's address space, using WriteProcess-Memory function.
3) It initializes a shared heap memory.
4) It copies onto the heap a small piece of assembler code (a patch) that executes the jump to the function that creates thread in the client process
5) It copies the injection function itself
6) It patches the entry point of kernel32.dll so that the entry point points to the shared heap address where the assembler code is located. Because of the lack of "Copy on Write" mechanism in Windows-95, this patching applies also to the client process.
7) It resumes the main thread of the client process.
8) In the client process, the entry point of kernel32.dll is called and, thus, the applied patch starts execution. The patch performs the following operations:
   a) The patch removes the patch applied on the kernel32.dll entry point and restores the original kernel32.dll code.
   b) The patch creates a new thread, which runs the injection function.
   c) The injection function loads the client-side trace library 125.
   d) The injection function initializes the client-side trace library 125 and the communication channel in the client process so that the two trace libraries 124, 125 can communicate.
9) If inst95_attach returns successfully, then the initial instrumentation of the client process is done and the tracing begins.

During a Process Attach, BugTrapper calls the inst95_attach_to_running_process function in the agent-side trace library 124. The inst95_attach_to_running_process function executes the following sequence of operations:

1) It initializes the communication channel for IPC with a client process
2) It calls a function create_remote_thread (not to be confused with the CreateRemoteThread API call in Windows-NT), that performs the following operations:
   a) It allocates memory on the shared heap.
   b) It copies various data (such as the Injection Function code and the path for the client-side trace library 125) onto the heap
   c) It finds a valid thread handle from the client process.
   d) It suspends the valid thread
   e) It sets the single step flag in the valid thread context
   f) It releases the valid thread A device driver, which will be further described below, intercepts the INT 1 interrupt that is caused by the first executed instruction of the above mentioned valid thread. Upon receiving the interrupt, the device driver sets the instruction pointer to the start address of the injection function that was copied onto the shared heap, and clears the single step flag in the valid thread context. After clearing the single step flag, the driver proceeds as if the interrupt was successfully handled, and returns the control to Windows-95.

Since the instruction pointer now points to the injection function, the injection function starts to execute in the context of the client process. The injection function continues as in the case of Creation Attach described above and creates a new thread that subsequently performs the loading of the client-side trace library 125 into the address space of the client 102.

In order to leave the interrupted valid thread intact, the injection function executes the breakpoint instruction, which immediately causes an INT 3 interrupt that is intercepted by the device driver. The device driver restores the thread context that was stored immediately after the thread was suspended and then the device driver returns the control to Windows-95.

Tracing execution

The trace function involves tracing the execution of the instrumented client process and reporting certain events to BugTrapper. The client-side trace library 125 accomplishes the tracing function by using breakpoints, and by reporting information concerning the status of the client process upon reaching the breakpoints.

During the execution of the client process, the execution trace is stored within a fixed size circular trace buffer 105 in memory. In the remote mode of operation the contents of the trace buffer 105 are copied to a trace log file 122. The trace log file 122 thus contains trace information that reflects a time window ending with the writing of the log file 122. The length of this time window is generally dependent upon the size of the trace buffer 105. In a preferred embodiment, the trace buffer 105 is small enough to allow the trace log file 122 to be sent to the developer's site using standard email programs. In the online mode of operation, the display is constantly being updated mirroring the trace buffer 105. The displayed information can also be saved to a log file 122 and later re-displayed.

After the client process has been attached, the process of tracing the execution of the client 102 involves the steps of installing breakpoints, triggering breakpoints, and catching breakpoints. Breakpoints are installed by overwriting the target address of the assembly instruction to be traced with an INT 3 instruction, occupying a single byte of space. The original byte at that address, along with other information, is stored in a data structure created by the agent-side trace library 124. The data structure, which describes all trace points, is preferably a hash table comprising a corresponding array of records for each hash value. The hashing is implemented with the target address as a parameter, allowing for a very fast searching for information concerning a trace point by using its address.

Breakpoints are triggered whenever the target address gets executed. When the target address is executed, the breakpoint instruction generates an INT 3 interrupt. On Windows NT this interrupt is handled by the Windows-NT kernel-mode handler. The kernel-mode handler transfers the execution to the user-mode routine KiUserExceptionDispatcher inside NTDLL.DLL (the system DLL). The KiUserExceptionDispatcher routine handles the task of locating a corresponding exception filter for the particular kind of exception.

Catching of breakpoints occurs within the context of the client 102. With standard debuggers, control would pass to the debugger process at this point. BugTrapper, takes a new approach, eliminating the need for context switching to properly trace the execution (for better performance). Since no context switching takes place, control remains with the client 102.

When the client-side trace library 125 is initially loaded, a patch is applied to the KiUserExceptionDispatcher function, having the effect of forcing a call to a function in the client-side trace library 125 before processing the exception. This function (the BugTrapper exception handler), determines whether the breakpoint occurred as a result of the tracing or for another reason. An exception that is not the result of tracing (i.e., no trace point has been installed at this target address) will result in a return of execution to KiUserExceptionDispatcher. When an exception is the result of the tracing, the handler notifies the appropriate routines in the tracing library 125 and defers the breakpoint, thereby allowing the original instruction at the target address to execute.

To defer a breakpoint, the original byte at the target address is restored, returning execution while setting the Single Step flag in the FLAGS register of the x86 processor. The Single Step flag causes an INT 1 interrupt to occur as a result of the execution of the original instruction. This interrupt is also treated as an exception, eventually reflecting into the BugTrapper exception handler. The handler restores the breakpoint instruction at the target address and returns for second time, allowing the client process code to continue running as if nothing happened.

In Windows 95, interception of the INT3 and INT1 interrupts is done by a device driver. The driver registers its interrupt handler for INT1 and INT3 interrupts. When the interrupt handler is called, it checks to see if the interrupt occurred in the context of the client process. If the interrupt occurred in the client process, then the interrupt handler changes the instruction pointer of the thread to the address of a function in the client-side trace library 125, and passes back on its stack any data needed by the function (such as thread context). After this function handles the trace point, it triggers an additional INT 3 interrupt that is recognized by the device driver. The device driver acts as if the interrupt has been successfully handled, causing the traced thread to continue execution. When the device driver recognizes that an interrupt has occurred not in the context of the client process, then the device driver passes the interrupt to the operating system interrupt handler (thus not affecting the normal behavior of other programs in the system or the operating system itself).

When tracing a plain source line (e.g., not a function entry or exit point), the client-side trace library 125 inserts data in the trace buffer to indicate that a trace point has been reached. When reaching a function entry trace point (apart from writing data to the trace buffer) a special mechanism is used because tracing of information regarding both the entry to and exit from the function is desired. This is preferably accomplished by modifying the return address of the function. The return address is located on the stack. The original return address is saved and a new return address point is inserted. The new return address points to a special assembly stub inside the client-side trace library 125. Therefore, when the function returns the assembly stub is called. The stub reports to the client-side trace library 125 function that the function has exited, and the client-side trace library 125 writes this trace point to the trace buffer. The stub then jumps to the real return address of the function.

In certain environments it is possible for a function to be entered but not properly exited. The function ceases running (with its stack erased and execution continuing elsewhere), but never returns to its caller. Therefore, for tracing purposes, it never returned to the BugTrapper assembly stub. For example, this would happen when a C++ exception occurs inside the a function and the exception handler at an outer function instructs the function generating the exception to exit, or when the setjmp()/longjmp() functions are used in C/C++ programs. To detect and trace such events, the microprocessor's stack pointer register (ESP) is checked whenever a trace point triggers to determine whether any functions have exited. The stack pointer normally grows down. Its position is registered at the entry of each function together with the above-mentioned return address. If the stack pointer has moved to a higher point than that at entry, the function is deemed to have exited, and the client-side trace library 125 reports that the function has exited. Several different redundant checks are also performed to ensure the reliability of this mechanism.

Additional Tracing and Attaching Features

The BugTrapper attaching technology can be used with multi-process and multi-threaded applications. Every trace record is associated with a process and a thread. Stack information is separately kept for each context. Therefore, the BugTrapper can trace two or more client executables at the same time. This allows BugTrapper to display any context switches between the processes and threads of the client(s) 102.

The BugTrapper supports the tracing of Dynamically Linked Libraries (DLLs), including all sub-formats such as OCX, Active-X, drivers (DRV), etc. The tracing of DLLs is accomplished by analyzing the client 102 process to find the DLLs it uses, and by displaying the source structures of the DLLs to the user. The user can then specify trace points within the DLLs as is done for any other executable. When applying trace points to a DLL, BugTrapper finds the base address into which the DLL was loaded, and uses the address to translate the addresses in the debug information to actual addresses in the running image.

The BugTrapper also supports the tracing of DLLs for which no debug information is available, such as system DLL's. The tracing of such DLLs is accomplished by tracking the exported functions used by the DLLs. This is done by analyzing the DLL exported function table in the client 102 to retrieve information concerning the exported function names and addresses. If the types of the parameters passed to these functions are known (e.g., if the header file including the declaration of the functions is available), then the parameter values and return value are also logged.

The BugTrapper also supports tracing of sub-processes. For example, when a first process P1 and a second process P2 are listed in the executable pane 314, and P1 spawns P2 as a sub-process, then BugTrapper will start tracing P2. This is done by tracing the CreateProcess function in all of the traced processes, even if the developer 112 did not specify tracing the CreateProcess function. By tracing CreateProcess, BugTrapper will know that P1 is going to spawn a sub-process, and BugTrapper can identify that the sub-process name (P2 in the present example) is listed in the executable pane 314. the client-side trace library will then create the sub-process and attach to the sub-process using the "Creation Attach" mechanism discussed above.

Variables and memory values can also be traced by BugTrapper. The user can view variable values as in an ordinary debugger. The variables may include function arguments, the C++ "this" pointer, function return values, local variables, global variables, static variables, etc. The data to which a pointer is pointing can also be traced. This information can be viewed for optimized builds, which cannot always be done by current debuggers. Tracking of variables in memory is accomplished by first analyzing the debug information to find the address (global, static, stack, or dynamic address) of the variable and the data it holds. BugTrapper then uses these addresses to dump to the trace log file 122 the memory content according to variable size.

When the traced application crashes, BugTrapper records the point where the failure occurred, even if the line was not specified in the TCI file 120. All stack variables are saved by using the Win32 debug API and the system library IMAGE-HLP.DLL.

Interprocess Communication

Communication between the client-side trace library 125 and the agent-side trace library 124 (in the agent 104 or the analyzer 106) can be divided into two categories. Category one comprises normal messages. Category two comprises trace data.

Category one communication is accomplished using standard Windows InterProcess Communication (IPC) primitives, such as shared memory to pass data, and semaphores to signal and synchronize. Normal messages include commands sent to the client-side trace library 125 such as, start trace function at a given address, or suspend tracing. Normal messages also include notifications sent by the client-side trace library 125, such as creation of a sub-process or run-time loading of a DLL.

The trace data itself is sent using a different mechanism, because of the quantity of data. Trace data comprises: function calls (including the assembly address of the called function); values of parameters for each call; function return values (including function address); tracing of other source lines specified in the TCI file 120 (including their address); variables value at these addresses; etc. The trace records are written to a shared memory area called the trace buffer 105, and from there either displayed in the BugTrapper user interface by the analyzer 106 (when performing an online trace) or written to a log file by the agent 104 (when performing a remote trace).

The client-side trace library 125 running in context of the various traced threads and processes, and the agent-side trace library 124, prevent simultaneous access to the trace buffer using a standard locking mechanism such as Mutex (in Windows-95) or Interlocked Functions (in Windows-NT). For performance reasons, when collecting trace data, the client-side trace library 125 preferably only writes trace data to the trace buffer 125 in shared memory. The client-side trace library 125 preferably performs no I/O to the disk or to the display. Disk I/O and display updates are done later by the agent 104 or the analyzer 106. This reduces the performance penalty imposed on the client 102.

Indexing of the Trace Data

In order to process scrolling of the trace tree efficiently, there should desirably be direct access to records in the trace buffer 105 or trace log file 122. Serial access would be inefficient because it would require a search for the needed data in the trace buffer 125 upon every tree scroll operation. To facilitate direct access, an index is maintained with every trace tree window. The index contains the locations of all of the "function call" records in the trace buffer, which are included in the filter of the corresponding window in which the trace tree is displayed. In addition to the location information, some user-interface related information such as whether the record is invisible ("collapsed") is kept. The developer 112 can "collapse" (remove from display) part of a tree which is located under a specific call in the tree hierarchy. Collapsing part of a tree influences the current displayed portion of the tree.

For example, assuming that only one record is displayed on a tree having a scroll bar, if the tree includes records (1 2 3 4 5) and the scroll bar is located at the middle, record 3 should be displayed. However, if records 2 and 3 are collapsed (leaving 1 4 5), then record 4 should be displayed. For a tree including more than a million lines, including thousands of collapsed records, the calculation of the location of the displayed portion of the trace data might be a time-consuming task. In order to do this efficiently, the analyzer 106 holds, together with the above-mentioned calls index, a special array SA, where SA[i] contains the number of visible records from record number 1000*i to 1000*(i+1). Use of the SA array greatly speeds up the task of locating desired trace information. For example, assume that records 500–550 are invisible (collapsed by the developer 112) and that the vertical scroll bar position is 1500. In this case SA[0]=950 and the appropriate record is 1550. The analyzer 106 calculates this number directly, without the need to scan the whole calls index: 1000–SA[0]+1500(scroll bar position)=1550. The SA array provides for very fast vertical scrolling. The SA array is updated each time a new record is read from the trace buffer 105 or the log file 122, or when the developer 112 collapses or expands some of the trace tree. In general, when the analyzer 106 draws a trace tree, it performs the following steps: (1) lock the trace buffer 105; (2) scan new records and update the calls index and the SA array; (3) read and analyze the records that must be shown; (4) merge the records with the debug information 121 and create strings for each record; (5) draw the page; and (6) unlock the shared memory trace buffer 105. Note that when reading data from a trace log file 122 only steps 3–5 are performed, since steps 1, 2, and 6 are unnecessary.

Other Embodiments

Although the present invention has been described with reference to a specific embodiment, other embodiments will occur to those skilled in the art. It is to be understood that the embodiment described above has been presented by way of example, and not limitation, and that the invention is defined by the appended claims.

What is claimed is:

1. A software system that facilitates the process of identifying and isolating bugs within a client program without requiring modifications to the executable and source code files of the client program, the client program including at least a source code representation, an executable code representation, and build information that relates the source code representation to the executable code representation, the software system comprising:

a first code module that displays source code elements of said client on a display screen together with controls that enable a software developer to interactively specify one or more elements to be traced, the first code module configured to generate trace control information based on selections by said developer of said source code elements to be traced, said first code module using at least build information to generate said trace control information, said build information generated during building of an executable representation of said client from a source code representation of said client;

a second code module that attaches to a memory image of said executable representation of said client program based on said trace control information, said second code module configured to monitor execution of said client program and to generate, based on said selections by said developer, trace information that reflects said execution, said second code module configured to run in a same context as said client program; and a third code module that translates said trace information into a human-readable form based on at least said build information, and displays translated trace information on said display screen to allow said developer to analyze the execution of said client program;

wherein said second code module is adapted to be executed separately from said first and third code modules, the system thereby enabling a developer to remotely control and evaluate the tracing of said client program.

2. A method of remotely debugging a client program which runs at a client site which is located remotely from a developer site, the method comprising:

using a first code module at the developer site to select a plurality of source code elements of the client program to be traced, and to generate trace control information which indicates said source code elements;

transmitting said trace control information to the client site;

at the client site, executing the client program together with a second code module which traces the execution of said client program based on said trace control information, to thereby generate a trace log which reflects execution of the client program;

transmitting said trace log from said client site to the developer site; and at the developer site, using the trace log to debug the client program.

3. A method of remotely debugging a client program which runs at a client site which is located remotely from a developer site, the method comprising:

using a first code module at the developer site to select a plurality of source code elements of the client progam to be traced, and to generate trace control information which indicates said source code elements;

transmitting said trace control information to the client site;

at the client site, executing the client program together with a second code module which traces the execution of said client program based on said trace control information, to thereby generate a trace log which reflects execution of the client program;

transmitting said trace log from said client site to the developer site; and at the developer site, using the trace log to debug the client program, wherein the first code module generates trace control information that is in a non-human readable form and the second code module generates a trace log that is in a non-human-readable form, so that the method is performed without exposing the client site to source code elements of the client program.

4. A method of remotely debugging a client program which runs at a client site which is located remotely from a developer site, the method comprising:

using a first code module at the developer site to select a plurality of source code elements of the client program to be traced, and to generate trace control information which indicates said source code elements;

transmitting said trace control information to the client site;

at the client site executing the client progam together with a second code module which traces the execution of said client program based on said trace control information, to thereby generate a trace log which reflects execution of the client program;

transmitting said trace log from said client site to the developer site; and at the developer site, using the trace log to debug the client program, by using a third code module which translates the trace log to a human readable form using build information.

5. A software execution tracing system for tracing execution of a client program without requiring modifications to the executable and source code files of the client program, the client program having at least a source code representation and an executable code representation, said software system comprising:

a first code module that attaches to a memory image of said client program, said first code module configured to monitor execution of said client program using debug-build information generated by a compiler and to generate trace information that reflects said execution; and a second code module that translates said trace information into a human-readable form, and displays translated trace information on a display screen to allow said developer to analyze the execution of said client program.

6. The software system of claim 5, wherein the first and second code modules are configured to run under the control of a multi-processing operating system, and at least said first code module runs in a process memory space that has been allocated to said client program by said operating system, said first code module thereby tracing the execution of said client program without requiring context switches.

7. The software system of claim 5, wherein said second code module displays said translated trace information on said display screen during execution of said client program.

8. The software system of claim 5, wherein said second code module displays process information, source code information, and trace detail information.

9. The software system of claim 5, further comprising trace control information stored in a trace control file.

10. The software system of claim 5, wherein said first module inserts interrupt instructions for generating interrupts at trace points, and intercepts said interrupts while said client program is running to thereby monitor execution of said client program.

11. A software execution tracing system for tracing execution of a client program without requiring modifications to the executable and source code files of the client program the client program having at least a source code representation and an executable code representation, said software system comprising:

a first code module that attaches to a memory image of said client program, said first code module configured to monitor execution of said client progam and to generate trace information that reflects said execution; and a second code module that translates said trace information into a human-readable forms and displays translated trace information on a display screen to allow said developer to analyze the execution of said client program, wherein said first code module is adapted to be sent to a remote user site together with trace control information, and where said first code module is adapted to be used at said remote user site as a stand-alone tracing component that enables a remote customer who does not necessarily have access to said source code representation or said second code module, to generate a trace file that represents execution of said client application at said remote site.

12. The software system of claim 11, wherein said trace control information does not reveal any source code element of said client program.

13. A software execution tracing system for tracing execution of a client program without requiring modifications to the executable and source code files of the client program the client program, having at least a source code representation and an executable code representation, said software system comprising:
- a first code module that attaches to a memory image of said client program, said first code module configured to monitor execution of said client program and to generate trace information that reflects said execution; and
- a second code module that translates said trace information into a human-readable form, and displays translated trace information on a display screen to allow said developer to analyze the execution of said client program, wherein said second code module provides an offline analysis mode which provides functionality for interactively analyzing said trace information after the monitoring of said client application has completed.

14. A software execution tracing system for tracing execution of a client program without requiring modifications to the executable and source code files of the client program, the client program having at least a source code representation and an executable code representation said software system comprising:
- a first code module that attaches to a memory image of said client program, said first code module configured to monitor execution of said client program and to generate trace information that reflects said execution; and
- a second code module that translates said trace information into a human-readable form, and displays translated trace information on a display screen to allow said developer to analyze the execution of said client program, wherein said second code module translates said trace information into a human-readable form based on at least build information, where said build information links said source code representation to said executable code representation.

15. The software system of claim 14, wherein said build information is generated by a compiler program.

16. The software system of claim 14, wherein said build information comprises build information generated by a compiler program during compilation of said client source code representation.

17. A software execution tracing system for tracing execution of a client program without requiring modifications to the executable and source code files of the client program, the client progam having at least a source code representation and an executable code representation, said software system comprising:
- a first code module that attaches to a memory image of said client program, said first code module configured to monitor execution of said client program according to trace control information stored in a trace control file and to generate trace information that reflects said execution, wherein said trace control file is moved to a remote computer and used with said first code module and said client program on said remote computer; and
- a second code module that translates said trace information into a human-readable form, and displays translated trace information on a display screen to allow said developer to analyze the execution of said client program.

18. The software system of claim 17, wherein said trace control file specifies trace points.

19. A software execution tracing system for tracing execution of a client program without requiring modifications to the executable and source code files of the client program, the client program having at least a source code representation and an executable code representation, said software system comprising:
- a first code module that attaches to a memory image of said client program, said first code module configured to monitor execution of said client program and to generate trace information that reflects said execution; and
- a second code module that translates said trace information into a human-readable form, and displays translated trace information on a display screen to allow said developer to analyze the execution of said client program, wherein said client program is traced from its starting point.

20. A software execution tracing system for tracing execution of a client program without requiring modifications to the executable and source code files of the client program, the client program having at least a source code representation and an executable code representation, said software system comprising:
- a first code module that attaches to a memory image of said client program, said first code module configured to monitor execution of said client program and to generate trace information that reflects said execution;
- a second code module that translates said trace information into a human-readable form, and displays translated trace information on a display screen to allow said developer to analyze the execution of said client program; and
- a third code module that displays source code elements of said client on a display screen together with controls that enable a software developer to interactively specify one or more elements to be traced, said third code generating trace control information which is used by said first code module to monitor and trace said execution of said client program.

21. The software system of claim 20, wherein said third code module modifies trace control information on-the-fly during tracing of said client program in response to interactive source-code-element selections of a user.

22. A method for simultaneously tracing the execution path of one or more client programs without requiring modification either source code or object code of said client programs, said method comprising the steps of:
- instrumenting an in-memory image of said client program by attaching a trace library module to said client program;
- collecting trace data relating to the execution of said client program and transferring said trace data to a trace log;
- transferring said encoded trace log to computer memory accessible by a trace analysis tool; and
- analyzing said trace data using said executable analysis tool by decoding and displaying said trace data.

23. The method of claim 22, further comprising the step of creating trace control information, said trace control information comprising commands used by said trace library module when collecting said trace data.

24. The method of claim 22, wherein said trace log is stored in shared memory.

25. The method of claim 22, wherein said client program is a dynamic link library.

26. A method for simultaneously tracing the execution path of one or more client programs without requiring modification either source code or object code of said client programs, said method comprising the steps of:
  instrumenting an in-memory image of said client program by attaching a trace library module to said client program;
  collecting trace data relating to the execution of said client program and transferring said trace data to a trace log;
  transferring said encoded trace log to computer memory accessible by a trace analysis tool;
  analyzing said trace data using said executable analysis tool by decoding and displaying said trace data; and
  creating trace control information, said trace control information comprising commands used by said trace library module when collecting said trace data, wherein said trace control information comprises function addresses.

27. A method for simultaneously tracing the execution path of one or more client programs without requiring modification either source code or object code of said client programs, said method comprising the steps of:
  instrumenting an in-memory image of said client program by attaching a trace library module to said client program;
  collecting trace data relating to the execution of said client program and transferring said trace data to a trace log;
  transferring said encoded trace log to computer memory accessible by a trace analysis tool; and
  analyzing said trace data using said executable analysis tool by decoding and displaying said trace data, wherein said library module is configured to run in a same context as said client.

28. A method for simultaneously tracing the execution path of one or more client programs without requiring modification either source code or object code of said client programs, said method comprising the steps of:
  instrumenting an in-memory image of said client program by attaching a trace library module to said client program;
  collecting trace data relating to the execution of said client program and transferring said trace data to a trace log;
  transferring said encoded trace log to computer memory accessible by a trace analysis tool; and
  analyzing said trace data using said executable analysis tool by decoding and displaying said trace data including translating said trace data into a human-readable form.

29. A method for simultaneously tracing the execution path of one or more client programs without requiring modification either source code or object code of said client programs, said method comprising the steps of:
  instrumenting an in-memory image of said client program by attaching a trace library module to said client program;
  collecting trace data relating to the execution of said client program and transferring said trace data to a trace log;
  transferring said encoded trace log to computer memory accessible by a trace analysis tool; and
  analyzing said trace data using said executable analysis tool by decoding and displaying said trace data, and translating said trace data into human-readable data based on at least build information and displaying said human-readable data on a display, where said build information links a source code representation to addresses in said trace control dataset.

30. The method of claim 29, wherein said display comprises an execution call tree display and a source code display.

31. The method of claim 30, wherein said execution call tree display and said source code display are synchronized such that said source code display displays source code for a function selected in said execution call tree.

32. The method of claim 30, wherein said execution call tree display shows execution call trees for a plurality of processes and/or threads.

33. The method of claim 30, wherein said execution call tree display shows execution call trees for a plurality of threads.

* * * * *